(12) United States Patent
Waterman et al.

(10) Patent No.: US 9,244,674 B2
(45) Date of Patent: Jan. 26, 2016

(54) COMPUTER SYSTEM SUPPORTING REMOTELY MANAGED IT SERVICES

(71) Applicant: Zynstra Limited, Bath (GB)

(72) Inventors: Simon Waterman, Somerset (GB); Dave Ettle, Bristol (GB)

(73) Assignee: Zynstra Limited, Bath (GB)

( * ) Notice: Subject to any disclaimer, the term of this patent is extended or adjusted under 35 U.S.C. 154(b) by 236 days.

(21) Appl. No.: 13/802,251

(22) Filed: Mar. 13, 2013

(65) Prior Publication Data

US 2014/0237464 A1 Aug. 21, 2014

(30) Foreign Application Priority Data

Feb. 15, 2013 (GB) .................................. 1302713.1

(51) Int. Cl.
*G06F 9/445* (2006.01)
*G06F 9/455* (2006.01)

(52) U.S. Cl.
CPC .............. *G06F 8/65* (2013.01); *G06F 9/45558* (2013.01)

(58) Field of Classification Search
None
See application file for complete search history.

(56) References Cited

U.S. PATENT DOCUMENTS

| | | |
|---|---|---|
| 2007/0234356 A1 | 10/2007 | Martins et al. |
| 2008/0189697 A1* | 8/2008 | Kachroo et al. ............... 717/171 |
| 2008/0271017 A1 | 10/2008 | Herington |
| 2009/0037680 A1 | 2/2009 | Colbert et al. |
| 2009/0265707 A1 | 10/2009 | Goodman et al. |
| 2009/0319740 A1 | 12/2009 | Nishi |
| 2010/0088699 A1 | 4/2010 | Sasaki |
| 2010/0106885 A1 | 4/2010 | Gao et al. |
| 2010/0192143 A1 | 7/2010 | Ingle et al. |
| 2010/0306173 A1 | 12/2010 | Frank |
| 2011/0225574 A1 | 9/2011 | Khalidi et al. |
| 2011/0265076 A1 | 10/2011 | Thorat et al. |

FOREIGN PATENT DOCUMENTS

| | | |
|---|---|---|
| DE | 4134207 C1 | 4/1993 |
| EP | 1643361 A2 | 4/2006 |
| EP | 1643361 A3 | 2/2008 |
| EP | 2182437 A1 | 5/2010 |
| GB | 2454775 A | 5/2009 |

OTHER PUBLICATIONS

Search Report for Great Britain Patent Application No. GB1302713.1, mailed on Aug. 15, 2013, 5 pages.
International Search Report and Written Opinion—PCT/GB2014/050420—mailed on Apr. 4, 2014, 14 pages.
United Kingdom Search Report—GB1302713.1—mailed on Nov. 12, 2013, 3 pages.

* cited by examiner

*Primary Examiner* — Chuck Kendall
(74) *Attorney, Agent, or Firm* — Kilpatrick Townsend & Stockton LLP

(57) ABSTRACT

Disclosed is a method of updating software in a computer system using virtualization software, wherein one or more virtual machines are arranged to run respective software modules for providing respective set of software services. A software update relating to a first software module running in a first virtual machine is received. The first software module is stored on a first storage entity associated with the first virtual machine. A copy of the first storage entity is updated in accordance with the received software update to produce a second storage entity containing an updated version of the first software module. A second virtual machine is created within the virtualization environment. The second virtual machine is associated with the second storage entity and arranged to run the updated version of the software module from the second storage entity. The first virtual machine remains operational during the updating step.

52 Claims, 9 Drawing Sheets

COMPUTER SYSTEM SUPPORTING REMOTELY MANAGED IT SERVICES

The present invention relates to a computer system supporting remotely managed IT services, a software architecture for such a system, and to processes for managing such a system. Particular aspects relate to processes for updating software on such a system.

Modern businesses and organisations typically rely heavily on a range of software services, including, for example, word processing, databases, file storage, email and World-Wide-Web access. Some of these services may be provided by way of application packages running locally on user workstations (e.g. word processing and spreadsheet applications), whilst others combine server applications running on a server device with user clients on user terminals (e.g. shared file storage, email, collaboration tools). Server devices for providing such software services are commonly installed locally on the premises of an organisation. Security functionality, in the form of firewalls, anti-malware solutions and the like may also be provided centrally within an organisation's local IT infrastructure. This necessitates some form of local IT support to manage the servers, firewalls, network infrastructure, clients etc. Support is further complicated by the fact that each organisation's IT infrastructure has typically grown organically over a long period of time and is therefore relatively unique, which can lead to reduced reliability and make the infrastructure more difficult to manage and maintain. All this can result in high local IT support costs.

In recent years, in part to mitigate these difficulties, there has been a trend towards increased use of cloud-based IT services. Such services fall into three broad categories. Infrastructure as a service (IaaS) is a model in which a service provider provides computing infrastructure, such as server hardware and/or data storage, which is typically located in centralised data centres accessible over the internet. Platform as a service (PaaS) involves provision of a cloud-based processing platform designed to support certain kinds of services. In addition to hardware resources, such a platform may include components such as an operating system, a database system, and a web server, libraries etc. to support an organisation's applications. The customer typically implements their own application within that platform. Software as a service (SaaS), on the other hand, involves provision of complete software services, hosted "in the cloud". These services are provided by applications configured and maintained by the service provider. For example, Google's Apps for Business platform provides a range of cloud-based software services, including the Google "Gmail" email system.

However, though cloud-based services (whether IaaS, PaaS or SaaS) can reduce complexity and support cost for the customer, these advantages can come at the expense of reduced flexibility and control. Furthermore, access to services is dependent on the network. The network distance between the local system and cloud-based service can introduce latency, making services less responsive, and network problems may prevent services from being accessed altogether. Also, integration of cloud-based services with local and legacy systems can be more difficult.

The present invention seeks to alleviate some of these problems.

In accordance with a first aspect of the invention, there is provided a method of updating software in a computer system, the computer system including virtualisation software arranged to provide a virtualisation environment for running a plurality of virtual machines, wherein each virtual machine is arranged to run a respective software module for providing a respective set of software services, the method comprising: receiving a software update relating to a first software module running (or adapted to run) in a first virtual machine, the first software module stored in a first storage entity associated with the first virtual machine; updating a copy of the first storage entity in accordance with the received software update to produce a second storage entity containing an updated version of the first software module, the updating step performed by an update module running outside the first virtual machine; and creating a second virtual machine within the virtualisation environment, the second virtual machine associated with the second storage entity and arranged to run the updated version of the software module from the second storage entity.

Storage entities may be storage volumes, preferably logical storage volumes. Alternatively, storage entities may represent physical storage volumes, or partitions of logical or physical storage volumes. Storage entities may be in the form of images or image files of storage units, such as disk images, volume images, or partition images. The term "storage entity" as used herein should thus be interpreted to refer to any appropriate unit of data storage, including any of the above examples.

The software update is preferably a data set or data package, for example in the form of one or more files, and may be obtained from storage local to the computer system, or received or downloaded from a remote server.

The update module preferably runs outside both the first and second virtual machines, but preferably within the computer system, more preferably within the virtualisation environment, e.g. within a third virtual machine separate from the first and second virtual machines.

Preferably, the first virtual machine remains operational to provide software services during (at least part of, or all of) the updating step, and optionally also during (at least part of, or all of) the configuring step. The method may also include launching the second virtual machine, and preferably initiating running of the updated version of the software module.

The updating preferably comprises performing difference patching, preferably binary difference patching. The software update preferably includes (binary) difference information specifying a difference between the first storage entity and an updated version of the first storage entity, the updating step comprising modifying the copy of the first storage entity in accordance with the (binary) difference information (e.g. so that the second storage entity corresponds or is identical to the updated version of the first storage entity). The difference information preferably relates to the storage entity (e.g. image or volume) as a whole (not to individual files within the storage entity).

Advantageously, the first storage entity is configured not to be modifiable from within the first virtual machine (and preferably also from within the second virtual machine). The method may further comprise configuring the second storage entity not to be modifiable from within the second virtual machine (and preferably also from within the first virtual machine).

The method may comprise, after the updating step, performing one or more testing operations to verify correct application of the software update and/or correct operation of the updated software. This may include one or more of: calculating check data of the second storage entity and comparing the calculated check data (e.g. a checksum) against corresponding check data included in the software update; configuring an external test module to perform testing; configuring a monitoring module to monitor operation of the second virtual machine.

The testing operations are preferably performed by the update module or by another software module running outside the first and/or second virtual machines. Testing operations may be performed by a module running in a third virtual machine within the virtualisation environment separate from the first and second virtual machines. The updated software may include a testing component, the method preferably comprising performing one or more testing operations by the testing component running within the second virtual machine, e.g. after booting the second virtual machine.

The testing operations are preferably performed based on testing information included in the received software update. In other words, the software updated preferably specifies one or more tests to be performed. Preferably, the received software update includes one or more test programs or test scripts, the method including performing testing operations by running the test program(s) or test script(s).

The method preferably comprises maintaining a copy of the first storage entity after the updating, and subsequently reverting to use of the first storage entity for running the first software module in its form prior to the update, preferably in response to an instruction to revert or detection of an error condition (e.g. during testing or monitoring).

The method preferably comprises terminating the first virtual machine, the terminating preferably performed after the updating step, and preferably before starting the second virtual machine. The first virtual machine may be terminated during the updating or creating steps.

Preferably, the updating step comprises securely obtaining the copy of the first storage entity prior to updating. The updating step (or the securely obtaining) may comprise accessing an encrypted copy of the first storage entity; and decrypting the encrypted copy prior to updating. Master copies of storage entities may be stored in a repository, e.g. at the computer system, including master copies corresponding to storage entities used by virtual machines to run software modules, the master copies preferably being encrypted. Software modules are preferably not run directly from the master copies in the repository. The updating step preferably comprises obtaining the copy of the first storage entity from the repository prior to updating.

The above update process may preferably be applied to multiple software modules/virtual machines based a single software update received at the computer system. For example, the received software update preferably includes update information relating to a plurality of software modules each associated with a respective first virtual machine, the method comprising: performing the updating and creating steps for each of the first virtual machines to create a plurality of corresponding second virtual machines each adapted to run updated software.

This feature may also be provided independently. Thus, in a further aspect of the invention, there is provided a method of updating software in a computer system, the computer system including virtualisation software arranged to provide a virtualisation environment for running a plurality of virtual machines, wherein each virtual machine is arranged to run a respective software module for providing a respective set of software services, the method comprising: receiving a software update including update information relating to a plurality of software modules associated with a plurality of (respective) first virtual machines of the virtualisation environment; generating, by an update module running outside the first virtual machines, updated versions of the plurality of software modules based on the update information; and replacing each of the first virtual machines with a respective second virtual machine adapted to run an associated (respective) updated software module.

The generating and replacing steps are preferably performed in accordance with the method as set out above. The following optional features may be applied to this aspect or any of the other aspects of the invention described.

Replacing a first virtual machine providing a given set of software services preferably comprises creating a second virtual machine to provide a corresponding set of software services (though the services may or may not be exactly the same, because the software may have been updated), and terminating the first virtual machine. After replacement, the second virtual machine preferably provides services to users of the computer system that were provided by the first virtual machine prior to replacement.

Preferably, the method in either of the above aspects comprises performing the updating for each of the plurality of software modules as part of a single update transaction, and rolling back the update transaction in response to an identified error condition or rollback instruction. The term "transaction" here preferably refers to a set of related operations (in this case software update and related operations) that are performed as a unit, such that all changes applied by the operations to create an updated system state (e.g. updated storage entities) are completed at the end of the transaction (if the transaction succeeds), or none of the changes are applied at the end of the transaction (if the transaction fails). This may involve rolling back or discarding any applied changes if the transaction fails, so that the system state reverts to its original state at the end of the failed transaction.

For example, in response to an error condition or rollback instruction, the method may include discarding all updates made to the plurality of software modules in response to the software update. The method may also include, in response to an error condition or rollback instruction, reverting to or continuing operation of the first virtual machines and/or first software modules in accordance with their configuration preceding the update.

The method may comprise, after completing the updating step for all of the first virtual machines, terminating each of the first virtual machines, and preferably starting up each of the corresponding second virtual machines. Alternatively the terminating may occur prior to the updating or at some other time.

The method preferably comprises running the update module in a third virtual machine within the virtualisation environment, the third virtual machine separate from the first and second virtual machines. The method preferably includes, in response to an instruction to perform the software update, creating the third virtual machine, and initiating running of the update module within the third virtual machine. The method may also include, in response to the instruction to perform the software update, securely obtaining a copy of the update module software, and running the obtained software within the third virtual machine.

This feature provides for a secure start-up of the update software, and may also be provided independently. Accordingly, in a further aspect of the invention, there is provided a method of updating software in a computer system, the computer system including virtualisation software arranged to provide a virtualisation environment for running a plurality of virtual machines, wherein each virtual machine is arranged to run a respective software module for providing a respective set of software services, the method comprising: receiving an instruction to perform a software update relating to a first software module running (or adapted to run) in a first virtual machine; and in response to the update instruction, replacing the first virtual machine with a second virtual machine running an updated version of the first software module, the updated version generated by an update module based on software update information associated with the received update instruction, wherein the replacing comprises: in response to the update instruction, securely obtaining a copy of the update module software; initiating running of the obtained update module software, preferably outside the first virtual machine and/or in a third virtual machine; generating, by the running update module, the updated version of the first software module; and configuring (optionally also by the update module) the second virtual machine to run the updated version of the first software module.

The following optional features may be applied to this aspect or any of the other aspects of the invention described.

The securely obtaining preferably comprises decrypting a master copy of the update module software. The master copy preferably comprises an encrypted storage entity storing the update module software in encrypted form, the method including: decrypting the encrypted storage entity to produce a decrypted storage entity; associating the decrypted storage entity with the third virtual machine; and running the update module within the third virtual machine from the decrypted storage entity.

Preferably, the method comprises terminating the third virtual machine and/or the update module after completion of the software update. Preferably, the securely obtained copy of the update module software is not used again after termination. The method may thus comprise performing the securely obtaining step each time the update module is run and/or each time a software update is processed.

Preferably, the first virtual machine is associated with: one or more immutable storage entities storing a first, immutable, portion of files associated with the first software module, the immutable portion comprising files which are not (or do not need to be) modified during operation of the module to provide software services; and one or more mutable storage entities storing a second, mutable, portion of the files associated with the first software module, the mutable portion comprising files which may be modified during operation of the module to provide software services.

This feature may also be provided independently. Thus, in a further aspect of the invention, there is provided a method of providing modular software services in a computer system, the computer system including virtualisation software arranged to provide a virtualisation environment for running a plurality of virtual machines, each virtual machine providing a respective set of software services and being associated with one or more storage entities storing files used in providing the services, the method comprising: associating with a first one of the virtual machines one or more immutable storage entities comprising a first, immutable, portion of the files associated with the first virtual machine, the immutable portion comprising files which are not modified during operation of the virtual machine to provide software services; and associating with the first virtual machine one or more mutable storage entities storing a second, mutable, portion of the files associated with the first virtual machine, the second portion comprising files which may be modified during operation of the virtual machine to provide software services.

The following optional features may be applied to this aspect or any of the other aspects of the invention described.

The one or more immutable storage entities are preferably configured for read-only access from within the first virtual machine. The one or more mutable storage entities are preferably configured for read and write access from within the first virtual machine. However, one or more components outside the first virtual machine, for example the update module, may have or be able to obtain write access to some or all of the immutable and/or mutable storage entities. Access permissions are preferably enforced by the virtualisation software (for example by a virtual machine monitor or hypervisor).

The immutable storage entities may comprise one or more of: a first immutable storage entity comprising software for execution by the first virtual machine; and a second immutable storage entity comprising configuration data relating to the software and/or the first virtual machine.

The configuration data is preferably specific to the computer system, the first storage entity comprising further configuration data common to a plurality of computer systems using the software.

The mutable storage entities may comprise one or more of: a first mutable storage entity comprising user data created during provision of services to a user by software running in the first virtual machine, the user data preferably associated with application software running in the first virtual machine, preferably wherein the user data is data that should be or is retained after the virtual machine is terminated or restarted or replaced; a second mutable storage entity comprising configuration data relating to application or operating system software running in the first virtual machine, preferably wherein the configuration data is data that should be or is retained after the virtual machine is terminated or restarted or replaced; and a third mutable storage entity comprising temporary data associated with application or operating system software running in the first virtual machine, wherein the temporary data is preferably data created during operation of the virtual machine which does not need to be or is not retained if the virtual machine is terminated or restarted or replaced.

The method may include backing up the first and/or second mutable storage entities but not the third mutable storage entity. The method may include creating a replacement virtual machine to replace the first virtual machine, the replacement virtual machine configured to use the first and/or second storage entities but not the third storage entity, the replacement virtual machine preferably created during processing of a software update for the first virtual machine.

Preferably, the first virtual machine is associated with a file system, the method comprising: including different first and second parts of the file system in respective first and second storage entities, preferably wherein the first storage entity is an immutable storage entity and the second storage entity is a mutable storage entity; and configuring the storage entities such that an access to a predetermined location in the first storage entity from within the first virtual machine resolves to a location in the second storage entity.

The configuring preferably comprises: including in the first part of the file system in the first storage entity a file system link to a target location in the second part of the file system in the second storage entity; or providing a mounting point in the first part of the file system in the first storage entity for mounting a location or directory tree in the second part of the file system in the second storage entity.

The method may comprise applying a software update in relation to the first virtual machine, the applying comprising updating one or more of the immutable storage entities or copies of those entities using (binary) difference patching, preferably based on (binary) difference information specifying a (binary) difference between a storage entity as a whole and an updated version of the storage entity. The applying may comprise updating one or more of the mutable storage entities using an update technique other than binary difference patching in relation to the whole storage entity.

The method may comprise applying a software update in relation to the first virtual machine, the applying comprising replacing the first virtual machine with a second virtual machine running updated software; wherein the replacing comprises: updating copies of one or more of the immutable storage entities by an update module running outside the first and second virtual machines; associating the updated storage entities with the second virtual machine; launching the second virtual machine; and updating copies of one or more of the mutable storage entities by an update component running within the second virtual machine.

The method in this aspect may comprise updating the first virtual machine using a method as set out previously.

In any of the aspects of the invention described herein, the virtualisation software may comprise one or more of a virtual machine manager; a control module, preferably arranged to run within a privileged virtual machine within the virtualisation environment; a storage virtualisation module arranged to provide access to logical storage entities to virtual machines of the virtualisation environment; a network module arranged to provide access to one or more network connections of the computer system to virtual machines of the virtualisation environment.

In a further aspect of the invention (which may be combined with any of the other described aspects of the invention), there is provided a method of providing software for execution by a computer system, the software arranged to provide software services to users of the computer system when run, the software comprising files to be stored in a file system, the method comprising: identifying a first, immutable, portion of the file system, the immutable portion comprising files which are not (normally) modified during operation of the software to provide software services; identifying a second, mutable, portion of the file system, the second portion comprising files which may be modified during operation of the software to provide software services; creating a first storage entity comprising at least some of the first portion of the file system; configuring the first storage entity for read-only access; creating a second storage entity comprising at least some of the second portion of the file system; and configuring the second storage entity for read and write access.

Preferably, the file system comprises a directory tree, the method comprising: identifying part of the directory tree at a first location within the immutable portion which is to be modifiable; adding the identified part of the directory tree to the second storage entity at a second location; and configuring a connection between the first and second storage entities linking the first and second locations. Configuring a connection may comprises adding a file system link to the first storage entity, the file system link linking to the identified part in the second storage entity. The file system link may be added to the first storage entity in place of the identified part, and may have a path name corresponding to the path name of the identified part, so that an access to the path name resolves, via the link, to the second storage entity. Alternatively, configuring the connection may comprise defining a mounting point in the first storage entity corresponding to the first location, for mounting the identified part of the directory tree from the second location of the second storage entity.

The method may additionally comprise transmitting copies of one or more of the storage entities to the computer system. The method may include configuring a virtual machine within a virtualisation environment at the computer system, associating the storage entities with the virtual machine, and preferably running software from the storage entities within the virtual machine.

The method may comprise updating one or more of the storage entities or associating mutable and immutable storage entities with a virtual machine as set out in any of the previous aspects of the invention.

In any of the described aspects of the invention, storage entities may comprise storage volumes, preferably logical storage volumes. Furthermore, in any of the described aspects of the invention, the computer system may include a single computing device or multiple computing devices. For example, the computer system may include a cluster of locally connected computers. Where there are multiple computing devices, the computer system virtualisation environment may include respective individual virtualisation environments provided on respective computing devices by respective virtualisation software running on those computing devices.

The computer system may be in the form of a server system (comprising one or more servers), or in the form of a client system, e.g. a client device such as a desktop or laptop personal computer.

The invention also provides a computer program product comprising software code adapted, when executed on a data processing apparatus, to perform any method as set out herein.

In a further aspect, the invention provides a computer system for providing modular software services, the computer system comprising: virtualisation means arranged to provide a virtualisation environment for running a plurality of virtual machines, wherein each virtual machine is arranged to run a respective software module for providing a respective set of software services; means for receiving a software update relating to a first software module running (or adapted to run) in a first virtual machine, the first software module stored in a first storage entity associated with the first virtual machine; means for updating a copy of the first storage entity in accordance with the received software update to produce a second storage entity containing an updated version of the first software module, the updating means comprising an update module adapted to run outside the first virtual machine; and means for creating a second virtual machine within the virtualisation environment, the second virtual machine associated with the second storage entity and arranged to run the updated version of the software module from the second storage entity.

In a further aspect, the invention provides a computer system for providing modular software services, the computer system comprising: virtualisation means arranged to provide a virtualisation environment for running a plurality of virtual machines, wherein each virtual machine is arranged to run a respective software module for providing a respective set of software services; means for receiving a software update including update information relating to a plurality of software modules associated with a plurality of first virtual machines of the virtualisation environment; an update module adapted to run outside the first virtual machines, the update module including means for generating updated versions of the plurality of software modules based on the update information; and means for replacing each of the first virtual machines with a respective second virtual machine adapted to run an associated updated software module.

In a further aspect, the invention provides a computer system for providing modular software services, the computer system comprising: virtualisation means arranged to provide a virtualisation environment for running a plurality of virtual machines, wherein each virtual machine is arranged to run a respective software module for providing a respective set of software services; means for receiving an instruction to perform a software update relating to a first software module running (or adapted to run) in a first virtual machine; and means for, in response to the update instruction, replacing the first virtual machine with a second virtual machine running an updated version of the first software module, the updated version generated by an update module based on software update information associated with the received update instruction, wherein the replacing means comprises: means for, in response to the update instruction, securely obtaining a copy of the update module software; means for initiating running of the obtained update module software, optionally in a third virtual machine; means for generating, by the running update module, the updated version of the first software module; and means for configuring the second virtual machine to run the updated version of the first software module.

In a further aspect, the invention provides a computer system for providing modular software services, the computer system comprising: virtualisation means arranged to provide a virtualisation environment for running a plurality of virtual machines, each virtual machine providing a respective set of software services; means for associating a virtual machine with one or more storage entities storing files used in providing software services, the associating means comprising: means for associating with a first one of the virtual machines one or more immutable storage entities comprising a first, immutable, portion of the files associated with the first virtual machine, the immutable portion comprising files which are not modified during operation of the virtual machine to provide software services; and means for associating with the first virtual machine one or more mutable storage entities storing a second, mutable, portion of the files associated with the first virtual machine, the second portion comprising files which may be modified during operation of the virtual machine to provide software services.

In a further aspect, the invention provides a system for providing software for execution by a computer system, the software arranged to provide software services to users of the computer system when run, the software comprising files to be stored in a file system, the system comprising: means for identifying a first, immutable, portion of the file system, the immutable portion comprising files which are not (normally) modified during operation of the software to provide software services; means for identifying a second, mutable, portion of the file system, the second portion comprising files which may be modified during operation of the software to provide software services; means for creating a first storage entity comprising at least some of the first portion of the file system; means for configuring the first storage entity for read-only access; means for creating a second storage entity comprising at least some of the second portion of the file system; and means for configuring the second storage entity for read and write access.

Any of the system aspects of the invention set out above may further include means for performing a method according to any of the described method aspects of the invention.

In a further aspect, the invention provides an apparatus, computing device, server, server cluster, or system having means for performing any of the methods set out herein.

In the above aspects, any of the recited means for performing specified activities may be provided in the form of a processor and associated memory or other tangible computer-readable medium storing instructions for performing the activities when executed by the processor.

The invention also provides a computer program and a computer program product for carrying out any of the methods described herein and/or for embodying any of the apparatus features described herein, and a computer readable medium having stored thereon a program for carrying out any of the methods described herein and/or for embodying any of the apparatus features described herein.

The invention also provides a signal embodying a computer program for carrying out any of the methods described herein and/or for embodying any of the apparatus features described herein, a method of transmitting such a signal, and a computer product having an operating system which supports a computer program for carrying out any of the methods described herein and/or for embodying any of the apparatus features described herein.

The invention extends to methods and/or apparatus substantially as herein described with reference to the accompanying drawings.

Any feature in one aspect of the invention may be applied to other aspects of the invention, in any appropriate combination. In particular, method aspects and features may be applied to apparatus aspects and features, and vice versa.

Furthermore, features implemented in hardware may generally be implemented in software, and vice versa. Any reference to software and hardware features herein should be construed accordingly.

Preferred features of the present invention will now be described, purely by way of example, with reference to the accompanying drawings, in which:—

SYSTEM OVERVIEW

Embodiments of the present invention provide a Hybrid Application Platform which aims to combine advantages of local on-premise provision with centralised cloud management.

In one embodiment, the HAP provides a local server or server cluster with local applications that is integrated with cloud services. The HAP can be supported remotely by a service provider or operator, and the HAP on-premise component has sophisticated capabilities to enable support to be provided at a lower effort than traditional support services. In another embodiment, the HAP architecture may be implemented on a client device such as a desktop or laptop personal computer, tablet computer, smartphone, or the like. In that case, the HAP provides software services directly to an end user, but remote management and support generally operates in the same way as for the on-premise server implementation. In practice, a particular computing device may of course operate both as a client device and as a server in different contexts.

The service provider may provide all the software on the HAP. Alternatively, an open standard development environment combined with bespoke APIs may be provided to enable third parties to add their own applications.

Figure 1:
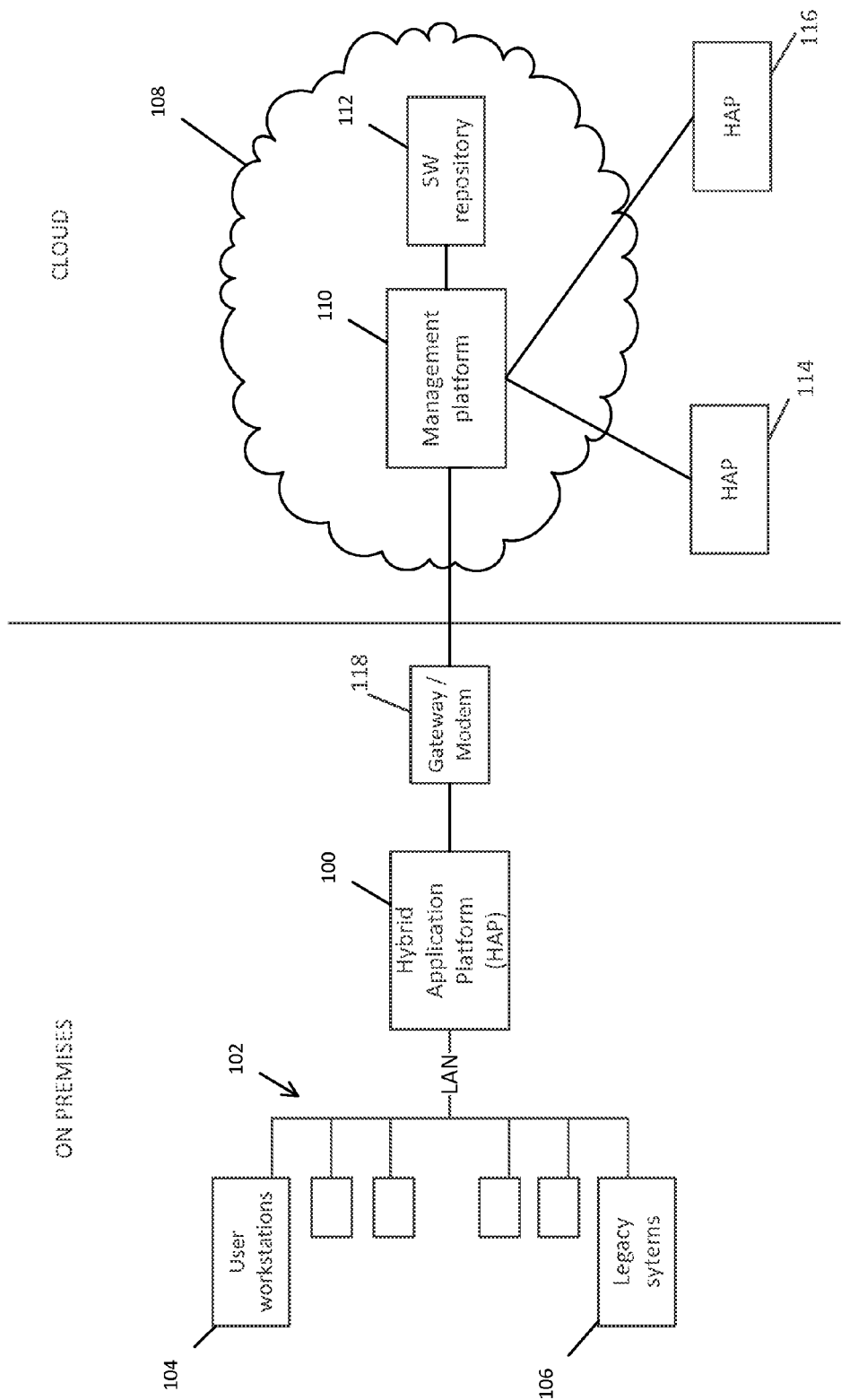
FIG. 1 illustrates an IT service provision architecture in overview, including a Hybrid Application Platform (HAP)

A server-based implementation of the system is illustrated in overview in FIG. 1. Though mainly discussed herein in relation to a server implementation, it should be understood that a client device implementation of the HAP architecture will generally operate in the same way and have the same features as the described server-based implementation.

The system includes a Hybrid Application Platform (HAP) on-premise server component 100 located on the user's premises, referred to from now simply as the HAP. The HAP provides a managed software environment providing a defined set of services. Configuration and maintenance of the HAP occurs largely remotely, reducing on-site support requirements.

The HAP may be in the form of a single server or other computing device, though alternatively multiple computers/server devices may cooperate to provide HAP functionality. For example, multiple HAP servers may be provided in a clustered configuration to provide resilience and/or increased capacity. In a typical configuration, two HAP servers may be locally connected to form a cluster, though a cluster may include any number of HAP servers. The term "HAP" as used throughout this disclosure may thus refer to a single computing device (e.g. server or client device) or to a HAP cluster of multiple such devices.

The HAP is connected to an on-premises local area network (LAN) 102, including, for example, user workstations 104 and other servers such as legacy systems 106 providing services not implemented in the HAP. The LAN 102 may include any suitable wired and/or wireless networking technologies.

The HAP is connected to a Gateway/Modem 118 providing access to an exterior network 108. The exterior network may be a wide area network, typically the Internet. Connection to the exterior network may be via any suitable networking technology, such as DSL/cable/fibre optic broadband internet connection or mobile telephone data connection, and so the Gateway/Modem 118 may include, or connect via, any necessary modem or other connection components. The HAP may alternatively incorporate some or all of the functionality of the Gateway/Modem, as well as router functionality and/or any other functionality needed to access the external network.

In preferred embodiments, the HAP implements firewall services and for that reason is shown occupying a gateway position on the LAN, with all other devices on the LAN connected to the external network through the HAP.

The HAP interacts with services provided remotely in the external network, referred to as cloud services. These include a management platform 110 which manages the operation of the HAP.

The management platform provides a variety of facilities to support and manage the HAP, including, for example:
- software installation and patching services
- remote monitoring, analysis and diagnostics
- remote recovery
- remote backup
- storage on demand
- anti-spam services
- a help centre The management platform includes or accesses a software repository 112 storing software and software updates (patches) for installation on the HAP.

The HAP is authenticated with the management platform to ensure that only authorised HAPs can access the management platform and to control which services a particular HAP can access. Additionally, the HAP may authenticate the management platform to ensure only an authenticated management platform can connect to the HAP.

The management platform typically manages multiple HAPs, including HAPs 114 and 116 installed at other locations.

The HAP provides a defined set of software services to local users/systems on the LAN. The term software service may refer to any service provided by software, and may refer to an application or program, a specific service provided by an application or program, or a service provided by multiple cooperating applications or programs. The exact services provided may vary depending on the requirements of the deployment context. However, in one embodiment, the HAP is designed to provide at least a basic set of IT services relating to file storage, connectivity and IT security required by most organisations. For example, these services may include:
- Firewall
- File server
- Anti-malware
- User Authentication
- Email The HAP is thus designed to provide the fundamental IT infrastructure for an organisation in an easily deployable, standardised system that can be managed remotely. This approach reduces IT management costs.

Additional software services required by particular organisations may be implemented as add-on components in the HAP or by way of legacy systems 106 interacting with the HAP.

The cloud services, including the management platform and software repository, are typically provided by a service provider or operator. The service provider typically installs preconfigured HAPs at customer premises, and provides remote support services via the management platform. HAPs may correspond to one or more standard configurations, and/or may be customized to a customer's requirements.

The Hybrid Application Platform (HAP)

The HAP provides a reliable, remotely manageable environment for providing a predefined set of software services.

The HAP software architecture is based on virtualisation. The architecture is designed to abstract, subdivide and control processor, memory, storage and networking resources in such a way as to present a highly available cloud platform built from commodity servers. Software services are split into functional components implemented in separate virtual machines within a virtualisation platform. A HAP controller module runs as a privileged virtual machine and controls the operation of the HAP, including the other virtual machines.

The architecture of the HAP will be described in more detail in the context of a particular implementation based on the Xen virtualisation platform. However, other virtualisation platforms could be used.

Figure 2:
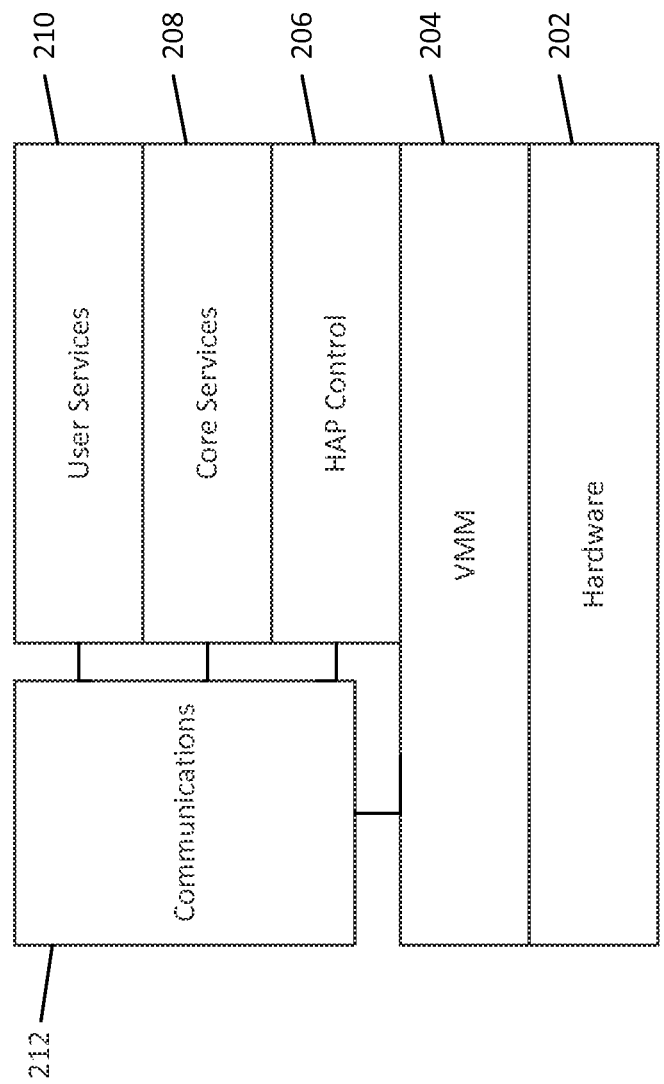
FIG. 2 illustrates the hardware and software architecture of the HAP in overview.

FIG. 2 depicts the HAP architecture in overview (as indicated above, this architecture may be embodied in a single server or a cluster of servers, in a client end device, or in any other type of computer system).

A hardware layer 202 includes the physical server hardware, such as processors, memory, storage and network connections. VMM (virtual machine manager or monitor) layer 204 manages virtualisation, and in this implementation includes a XEN hypervisor running on each server. Other implementations may use other types of VMM/hypervisor (the terms virtual machine manager, virtual machine monitor, and hypervisor are essentially equivalent and as such are used interchangeably herein). HAP control layer 206 includes a set of virtual machines implementing fundamental control functions for the HAP. Core services layer 208 provides a set of VMs implementing core services for management and operation of the HAP, such as firewall, monitoring, and software update services.

User services layer 210 includes VMs implementing the services accessible to and used by user devices on the LAN, such as file servers, email servers, and the like. Communications layer 212 enables communication between the VMM layer 204 and the VMs in layers 206-210 (via dedicated control channels) as well as communication between the VMs in those layers (via a virtual network).

The various software components in layers 206-210 are implemented as separate VMs running under control of the underlying virtualisation layer 204. This provides isolation between those components and also allows those components to be managed, installed, patched and restarted independently of other components.

The control layer 206 and core services layer 208 essentially provide a virtualised "operating system" for the HAP, by providing an environment and associated support functions to enable and support operation of the user service VMs in user services layer 210.

Figure 3:
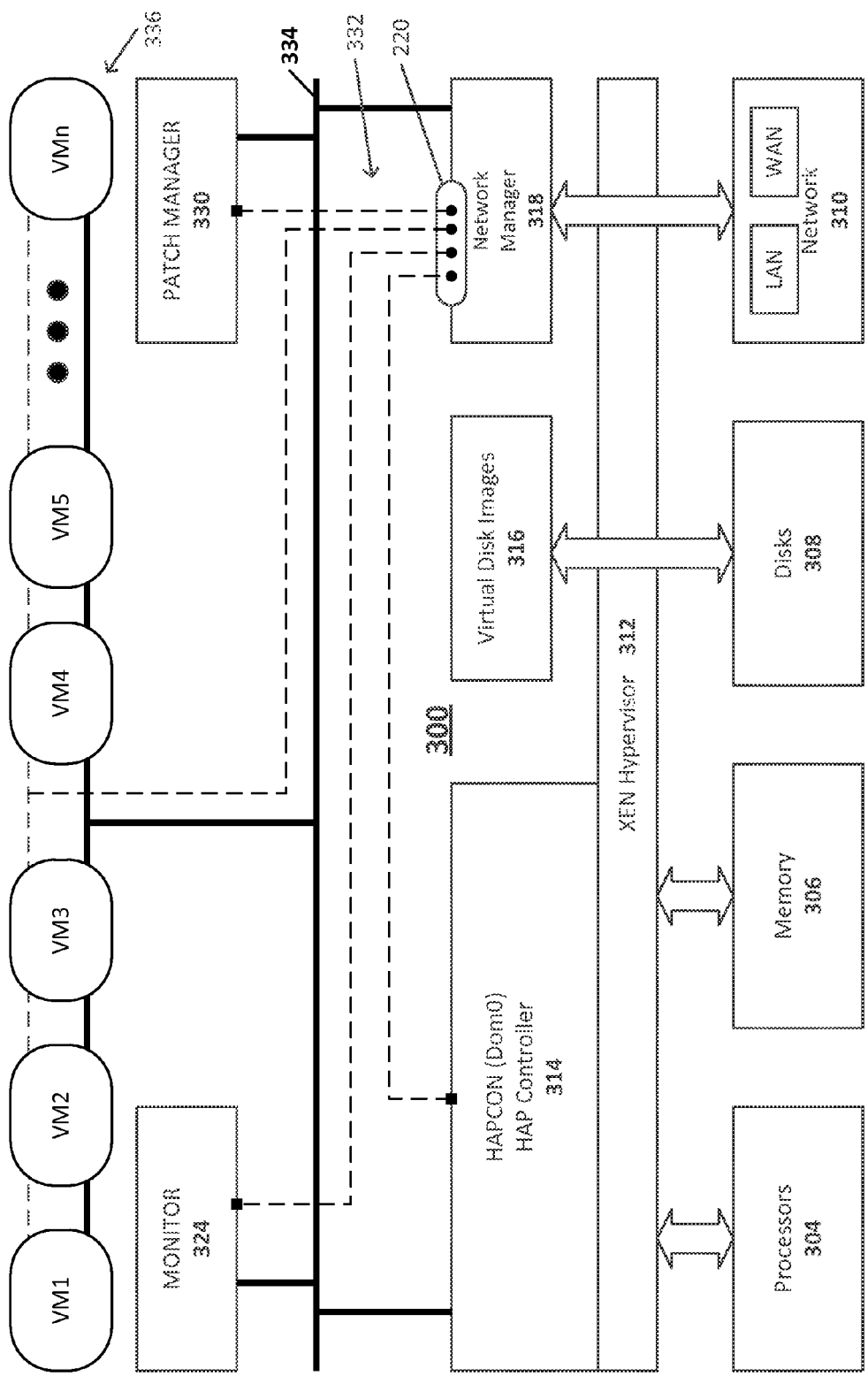
FIG. 3 illustrates the HAP architecture in more detail.

The architecture of a HAP device 300 is illustrated in more detail in FIG. 3. The hardware layer includes one or more processors 304, memory (typically volatile RAM) 306, and one or more persistent storage media (e.g. physical disks) 308. The persistent storage media may include read-only as well as read-write media utilising any suitable storage technology, e.g. optical drives, magnetic storage drives (hard disks), and persistent memory such as solid state drives (SSD) and FLASH memory. One or more network interfaces 310 are also provided, typically including one or more LAN network interfaces as well as one or more WAN network interfaces (which may incorporate, or provide connection to, routers, modems and the like as necessary).

Processor resources 304 and memory resources 306 are virtualised by XEN hypervisor software 312. This provides virtualisation below the operating system level, i.e. each VM running within the virtualised environment implements a separate virtual execution environment including an operating system running within that environment. As a result, different VMs may run different operating systems and/or different configurations of the same operating system.

The virtualisation means that the OS and other software within a VM runs as if on a dedicated hardware platform, i.e. the virtualisation is (for the most part) transparent to software running in the VM environment.

The HAP control layer includes a set of VMs providing control of the HAP and access to its resources. It includes the HAP controller (HAPCON) 314, which is a privileged VM (referred to as Domain 0 or Dom0 in the Xen context) which controls the HAP and can start, stop and control the other VMs and interact directly with the hypervisor 312.

A set of virtual disk images 316 are provided through storage virtualisation of the physical storage media 308. The virtual disk images are made available for use by VMs and mapped by virtualisation to the underlying physical storage. Virtual disk images may also be referred to as logical volumes.

Typically each VM is associated with one or more virtual disk volumes. For example, a first volume may hold the VM OS and software, and one or more further volumes may hold configuration and user data.

Communication between VMs is via a virtual network 332. A network manager (318) provides access to the network connections 310. It implements a virtual switch (or router) 220 allowing communication via standard networking protocols (e.g. TCP/IP) between the other VMs and the LAN and WAN connections 310, and amongst the VMs. It may make virtual network interfaces available which are mapped to the LAN and WAN connections. All communication between VMs (except control traffic between the HAP Controller and other VMs) preferably occurs via this virtual network.

Network functionality also includes security functionality, in particular a firewall. Other related functionality that may be provided includes (but is not limited to):
 anti-spam
 content filtering
 antivirus
 anti-phishing
 anti-spyware
 intrusion prevention
 firewall
 VPN
 router
 web cache This functionality may be provided within the network manager, in one or more separate VM components, or a combination.

In addition to storage virtualisation and network access, additional components may be provided (not shown) to provide controlled (possibly virtualised) access to other internal hardware resources or external peripheral devices to VMs running in the HAP.

The HAP control layer further includes a number of additional VM components providing fundamental HAP control functionality, including:
 MONITOR 324, a monitoring module for monitoring VMs running in the HAP
 PATCH MANAGER 330—manages application of software updates to VMs, and is described in more detail below, where it is also referred to as the "update module"

As mentioned above, the Core Service and User Services layers consist of additional VMs 336 (VM1-VMn) running on top of the virtualisation platform. The Core Services layer includes a variety of VMs implementing software services used by the HAP and by the User Service layer. Examples of components include:
 Decision and Control
 Analysis and Reporting
 Domain Controller/Directory (e.g. Active Directory Service)
 IMAP/MAPI
 SMTP
 Anti-Spam
 Storage
 Web Filter & Proxy
 IDS
 Traffic Shaping
 Firewall The user services layer includes the software services accessed by user devices and other systems connected to the HAP. Each component is again implemented as an individual VM within the Xen environment.

Examples of typical user service layer VM components include:
 Management Portal (for local management of the HAP)
 Authentication and Authorisation
 Mail Server (e.g. Exchange)
 Address Book
 SharePoint
 File Server (e.g. Samba)
 Search
 E-mail Anti-Virus
 File Anti-Virus Backup and Recovery
VPN Access
DNS
DHCP VMs in the Core Services and User Services layers are referred to herein generally as Service VMs.

The functional components described above (including core service and user service VMs) are intended as examples of components that may be provided in a server implementation of the HAP. While some of these are applicable to a client HAP implementation, others may not be needed in that context. On the other hand, a client HAP may include further functional components and service VMs not mentioned above. These variations are discussed in more detail below.

Furthermore, the exact choice of components and service VMs may vary not only based on whether the HAP is implemented on a server or client device, but also on the application context and deployment-specific requirements.

In principle, any VM component in the architecture may implement any required combination of OS and software services. However in preferred embodiments, each VM component is specifically designed to provide a single software service or function (or closely related group of services or functions). This approach provides a number of advantages:

- The OS and other software in each component can be provided in a stripped down configuration focussed on the specific service functionality required, omitting non-required OS and software components. This can provide greater reliability (by reducing complexity) and security (by eliminating potential vulnerabilities) of the individual VMs.
- Testing prior to deployment is simplified, both of the individual VM component and its interaction with other components.
- Troubleshooting after deployment may also be easier in view of the limited functionality implemented by each VM
- Patching is simplified
- Component functionality can be reused instead of being included in multiple VMs For example, instead of integrating authentication functionality separately into, e.g., mail server and file server service VMs, authentication functionality can be implemented in a separate VM component. The authentication VM can then provide authentication services for both the mail server and file server VMs. The HAP thus provides a modular service architecture allowing services to be provided through cooperation between different VM components.

Service VMs

As described above, each VM component essentially represents a prepackaged unit of software functionality. It can be provided in the form of one or more disk images containing OS and other software, plus configuration data used by the HAP Controller to install and set up the VM (for example specifying resources needed, data access rights, firewall rules and the like). The VM software typically includes a stripped down OS and a specific tailored set of software applications. For added security, the OS may be locked down such that only the specified programs can run in the VM.

The disk image(s) corresponding to a VM component and any associated configuration data may be pre-stored on the HAP or may be downloaded on demand from the software repository 112 (see FIG. 1). To activate the component, the HAP Controller 314 configures a VM based on the disk images and configuration data. The VM then boots from the relevant virtual disk volume containing the operating system for that VM. At that point, the VM is then operational, and can run any necessary applications and software tasks in accordance with its configuration.

The service provider may maintain a build/installation template that specifies how to build the disk image(s) for a particular VM. This may, for example, specify the software modules to be installed and any configuration information concerning the installation. A copy of the built VM images may be stored in the software repository in the cloud from where they can be downloaded to a HAP. Copies may also be stored locally in the HAP for backup/recovery purposes.

Deployment Models

The HAP may be configured with a predetermined set VMs to provide a fixed, predetermined set of services. The advantage of such a fixed deployment (which may be common to multiple or all customers of the service provider) is that it is easier to manage. Such a system can, as described above, provide a basic IT infrastructure for an organisation. Specialised systems used by the organisation (for example accounting software) can use the HAP services over the LAN (just as if those services were provided by conventional servers, e.g. conventional mail and file servers).

Alternatively, custom software modules may be added to the HAP in the form of additional VM components. Such custom modules may be configured and deployed by the HAP operator.

The software run in each VM is preferably fixed and determined by the service provider. This may be achieved by providing the software as read-only storage volumes which cannot be modified from within the VM. Furthermore, software updates to the VM software are carried out under the control of a central update module, rather than from within the VM itself, as described in more detail below.

VM File System

Because the OS and application software for a given VM is generally preconfigured by the service provider and not modifiable by a HAP user (e.g. the user cannot install additional applications in a VM), the software configuration for a VM is known exactly. In a preferred embodiment of the invention, to ensure consistency of software across HAPs and to simplify patching, VMs are therefore designed with file systems divided into mutable and immutable parts.

The immutable parts of the file system include those parts that do not change while the VM is being run. These parts generally only change when the VM is patched. The immutable parts include, for example, the OS and application software, including the executable code files and libraries, and some configuration data.

The immutable parts of the VM file system are stored on one or more read-only logical volumes. In particular, these volumes are configured to be read-only at least from within the VM but may be modified by the external update module as necessary.

The read-only restriction is enforced by the hypervisor (i.e. outside the VM itself). Software running within the VM is thus prevented from modifying these storage volumes (since the system will not permit writes to a storage volume configured as read-only). This prevents unauthorised software updates as well as malicious changes to the software e.g. by viruses and thus increases security and reliability. It also ensures that the software being run exactly matches what is intended by the service provider and enables the service provider to ensure consistency across HAPs. As a further advantage, changes to the immutable storage volume(s) can be applied efficiently by way of binary difference patching as described in more detail below.

The mutable parts of the VM's file system include any information that may change during running of the VMs. This may include some configuration data for the operating system and applications, as well as user data and other context data (e.g. application data, log files and the like). These mutable parts are thus stored on one or more logical volumes enabled for both read and write access (from within the VM). The system permits both read and write access to such volumes from software running within the VM.

Figure 4:
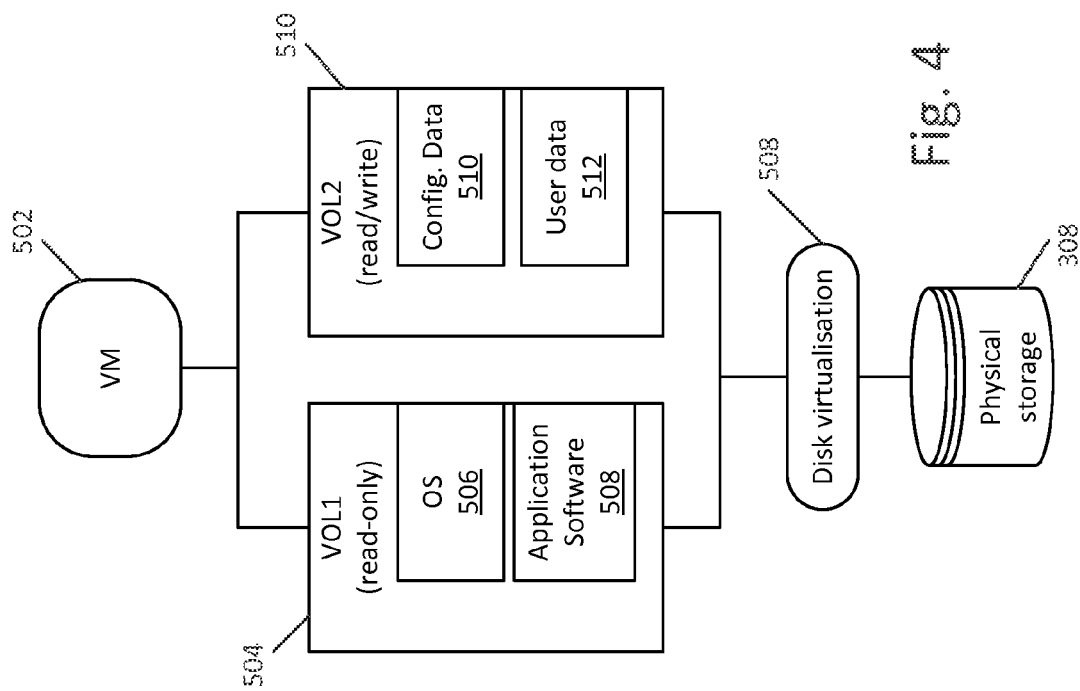

The division of the file system is illustrated by way of example in FIG. 4, which shows a VM 502 accessing two logical volumes, VOL1 504 and VOL2 510. VOL1 is a read-only volume storing an immutable part of the file system, whilst VOL2 provides read/write access and stores a mutable part of the file system.

In this particular example, VOL1 includes OS Software 506 and Application Software 508 (i.e. software code and associated unchanging data) and is a read-only volume. VOL2 includes modifiable configuration data 510 and user data 512 and provides read/write access.

VOL1 and VOL2 are both logical volumes (or virtual disks) exposed by disk virtualisation layer 508 from physical disk storage 308.

Figure 5:
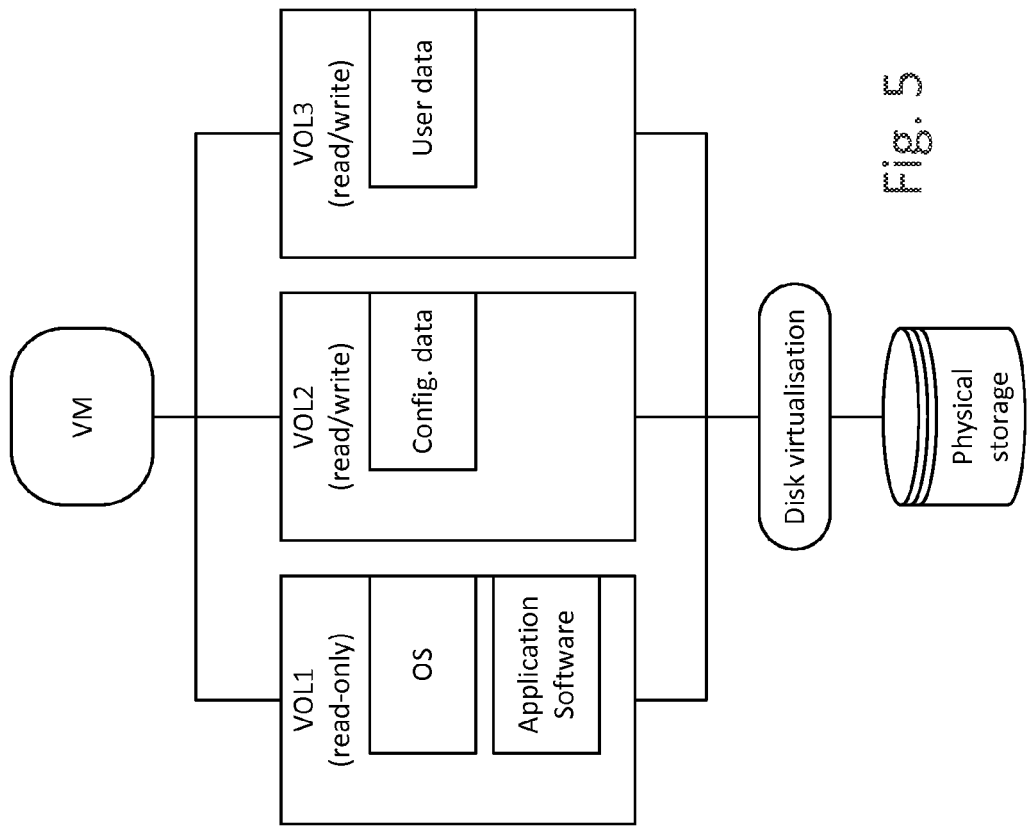
FIGS. 4 and 5 illustrate structures of virtual machine (VM) file systems.

FIG. 5 illustrates a variation in which configuration data and user data are stored on separate volumes (VOL2 and VOL3), which may provide additional security advantages. Similarly, OS and Application software could be distributed across multiple (typically read-only) volumes in any appropriate manner. More generally, the file system(s) associated with a VM may be distributed across any number of virtual storage volumes, divided into immutable and mutable volumes.

The division of VM file systems into mutable and immutable parts provides a variety of advantages in relation to VM management, patching, migration and failure recovery. Using this approach, the service provider can ensure that different HAPs are running exactly the same software at the binary level (see also the discussion on patching below), resulting in predictable performance and greater reliability. Replication can be reduced since only a single copy of the immutable parts needs to be stored (and backup requirements can be reduced since immutable parts generally do not need to be backed up for each HAP but can be regenerated from a master copy). Reverting to an earlier/original version of software is also simplified.

Aside from dividing the VM file system into mutable and immutable portions, it can be useful to additionally subdivide the mutable portions into those parts which need not be preserved and can be discarded on shutdown/restart of the VM, and those parts which should be backed up and preserved across restarts. Note that immutable parts are automatically preserved, in the sense that by definition they do not change during operation of the VM.

In an example implementation, each VM's files are subdivided into up to five separate file system sections in accordance with the following categories:

1. OS and application software, and configuration data relating to these which is fixed by the service provider and identical across multiple HAPs/multiple customers. This section is immutable at run time.
2. Configuration data relating to the OS and application software which is specific to the HAP or customer but which is also treated as immutable at run time (for example network configuration information specific to the HAP environment, e.g. IP address ranges).
3. Configuration data relating to the OS and application software which may change during operation of the VM (for example user preferences). This data should be preserved if a VM is stopped/restarted, e.g. during patching. This part is modifiable at run time.
4. User data. This comprises context information which is accumulated and changed during running of the VM and which should be preserved if a VM is stopped or restarted, e.g. during patching. Examples include application data, such as database files for a database, email archives for an email server application, and the like. This part is modifiable at run time.
5. Context information which is accumulated and changed during running of the VM but which need not necessarily be preserved, such as temporary application data maintained by applications or the operating system, e.g. OS log files, swap partitions, and the like. This part is modifiable at run time, and may be discarded when a VM is stopped/restarted, e.g. during patching.

Each of the above categories of file system information may be stored on one or more separate logical storage volumes. Storage volumes for categories 1-2 are configured as read-only from within the VM, whereas storage volumes for categories 3-5 are configured for read/write access from within the VM.

The above subdivision of VM file systems can be particularly advantageous in relation to VM management and patching. However, other subdivisions are of course possible, for example by combining some categories or further subdividing some categories.

Storage of the logical volumes is managed by the disk virtualisation layer, and thus the volumes may be stored on a single physical storage medium or distributed across physical storage media in any suitable manner, and may be moved and backed up transparently.

Some features of the HAP described herein (for example volume-level binary difference patching as described below) rely on the ability to divide the VM software installation cleanly into immutable (e.g. code) and mutable (e.g. data) portions. However, some software may not be designed in a way to enable such clean separation. For example, some applications in UNIX-like environments are known to store certain changing configuration or logging data within subdirectories of the "/usr/bin" directory, which is ordinarily intended to accommodate only executable program code and libraries.

In preferred implementations of the present system, this can be accommodated by creating dynamic links between storage volumes holding immutable and mutable parts of the file system.

In one approach, hard or soft symbolic links are created in the immutable part of the file system (i.e. on a read-only storage volume) to a corresponding location in the mutable part (i.e. on a read/write storage volume).

For example, a file system link may link from a given location on an immutable volume to a directory or file on a mutable volume. The link is given the same name as the directory or file it replaces so that the redirection is transparent to the application.

In an alternative approach, a read/write storage volume comprising a directory tree of mutable files may be dynamically mounted within an immutable, read-only storage volume at a specified location (e.g. within an empty directory), by the OS file system during startup of the VM, based on a configuration file defining the storage volumes and mounting points.

This approach of separating out the executable parts of the software (and associated unchanging data such as resource files and some configuration data) and placing them in read-only storage simplifies patching, and also prevents modification of the software and thus ensures conformity of software deployments across different HAPs.

Though described above as being divided into separate mutable and immutable storage volumes (typically logical storage volumes), the division may be made based on units of storage other than whole storage volumes. For example, a file system may be divided into separate partitions within a single (logical) volume, including read-only (immutable) and read-write (mutable) partitions.

HAP Software Repository

The HAP preferably maintains a software repository storing master copies of storage volumes for use by virtual machines. These may be in the form of disk images or the like. Thus, where this disclosure refers to storage, copying, manipulation (e.g. patching) or other processing of storage volumes, such processes may be carried out on disk images or volume images. References throughout this disclosure to processes involving storage volumes should be interpreted accordingly.

The repository in particular includes copies of immutable storage volumes used by VMs in the HAP.

When creating a new virtual machine, the required storage volumes (or copies thereof) are preferably obtained from this repository. This also applies when a VM is restarted (e.g. during patching as discussed in more detail below).

Copies of storage volumes are preferably obtained from the repository in a secure manner, to prevent inadvertent or malicious modification. In a preferred embodiment, storage volumes or associated disk images are stored in the repository in encrypted form. Copies are obtained and decrypted when a VM is configured. The decryption may be performed by or at the instigation of the HAP Controller, for example using a decryption key held by the HAP Controller.

Applying Software Updates to VMs

Patching involves updating a VM's software, including operating system software and application software as necessary. This may include updates both to executable components as well as resource files and configuration data associated with the software. User data, however, is generally not affected by such updates (though there may be exceptions, as discussed below).

Patches may be applied by running patch scripts (e.g. to replace or update individual files) or invoking OS-specific update software, such as Windows Update for Windows-based VMs. Such approaches typically operate from within a VM being patched—i.e. update software or scripts are run within the VM's OS.

However, preferred implementations of the HAP use an alternative approach in which updates are applied externally where possible. In particular, an update module external to the VM being patched accesses storage volumes associated with the VM and updates them as required. This external update component is implemented as a software module running in a separate VM (e.g. in the core services layer 208 as depicted in FIG. 2). This approach has the advantage that patching is not under control of the VM being patched (and more particularly, the software running within it), which improves security and reliability. Furthermore, it enables the original VM to remain operational until the patching process is complete, which reduces downtime and improves availability.

The HAP (or specifically the update module) may receive patches from the central management platform 110/software repository 112 (FIG. 1) via the network and apply these as needed. Patches may be obtained and applied in response to a local operator command or automatically, or may be pushed from the management platform/SW repository.

Where possible, binary difference patching is used, preferably applied to logical storage volumes as a whole. This applies in particular to storage volumes classified as immutable (generally those storing executable software) since the content of such storage volumes is fixed and known.

Configuration data and user data typically do not change during the patching process (though if they do, for example to modify configuration data for a new software version, this can be done by executing a suitable patch script).

A patch typically specifies which storage volumes associated with a VM are to be updated and how the updates are to be applied (e.g. by binary difference patching), and includes any necessary update information (e.g. binary difference information). The patch may also specify any testing required after application of the patch, and may provide checksums or other verification data to enable correct application of the patch to be verified.

Patching the VM involves modifying any of the storage volumes that need to be updated. Not all of the storage volumes associated with the VM may require updating; for example, in many cases, user data volumes, volumes storing log files and operating system temporary files will not need to be updated. In some cases, only a single storage volume, storing the OS and application software, will need to be updated.

Figure 6:
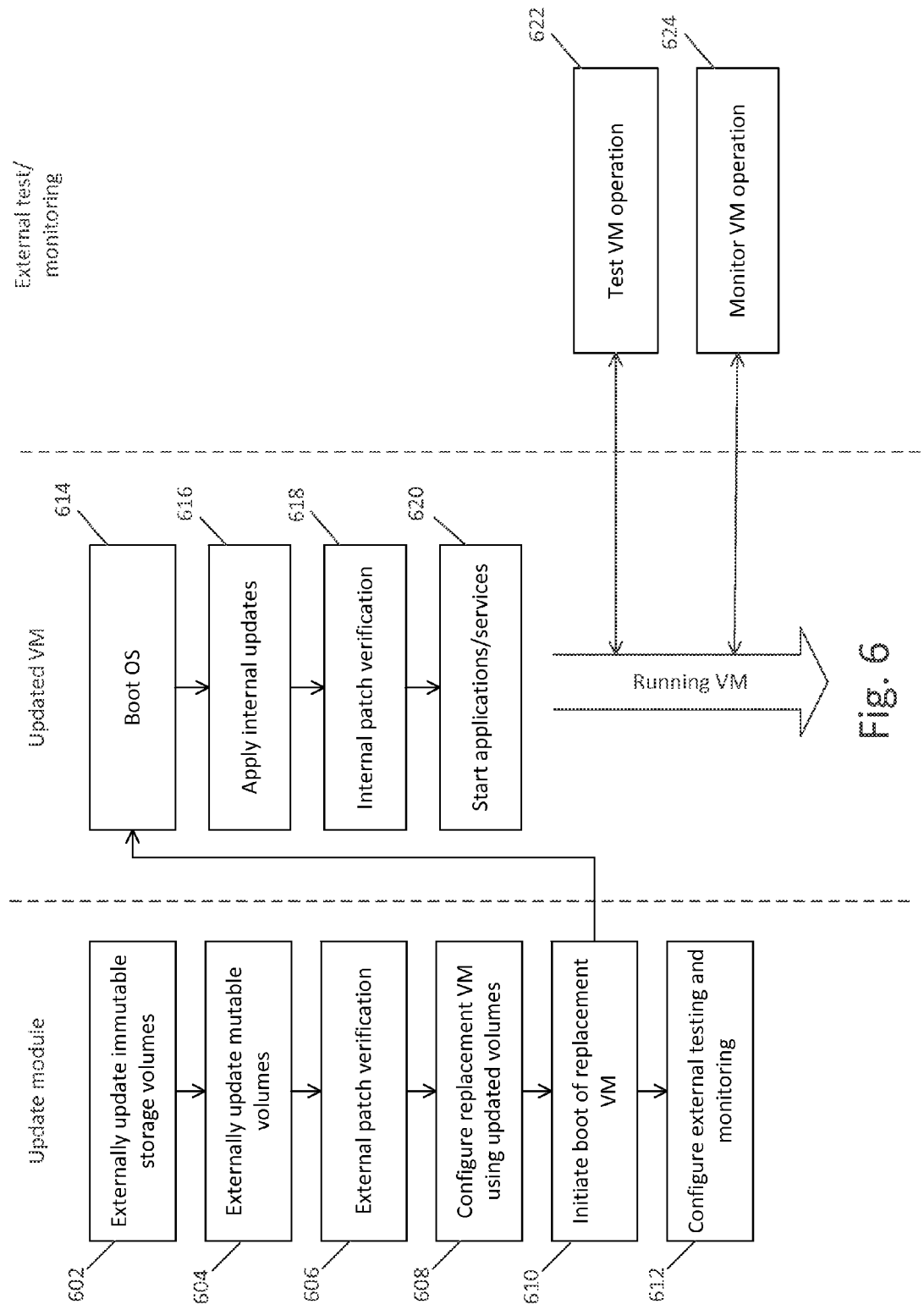
FIG. 6 is a process diagram illustrating a process for patching a VM.

The process of patching an individual VM is illustrated in FIG. 6. The process is divided into steps carried out by (or under control of) the update module (left-hand column of the diagram), and steps carried out by software running within the updated VM (middle column of the diagram). Thus, the processes on the left of the diagram occur externally from, and outside the control of, the VM being updated. External testing and monitoring of the VM after the update may also be carried out, as shown in the right-hand column of the diagram.

In step 602, the immutable storage volumes are updated. In a preferred embodiment, this occurs via binary difference patching as described in more detail below.

In step 604, mutable storage volumes are updated, if applicable. Binary difference patching is typically not suitable for this since the content of the storage volumes is not exactly known. Instead, the update module may locate the relevant files that need to be changed or added within the storage volume, and replace, update, add, or remove those files individually. The update module may mount the storage volume within its own VM to gain access to the volume.

In step 606, external patch verification is performed to confirm that the storage volumes have been correctly updated. For immutable storage volumes, whose content is invariant and exactly known, this may, for example, involve calculating a checksum of an updated volume and comparing it to a corresponding checksum received with the patch. For mutable storage volumes, other verification operations may be performed.

Once verification has been successfully completed, a replacement VM is configured in step 608 using the updated storage volumes, together with any other storage volumes that have not been updated. Configuring a VM involves creating a configuration file specifying, for example, the resources needed by the VM and the storage volumes to be associated with the VM (with one storage volume being identified as the boot volume).

In step 610, the update module initiates booting of the replacement VM (e.g. by notifying the HAP Controller).

The HAP Controller then creates, and sets running, a VM in accordance with the specified configuration, booting the VM OS from the specified boot volume (step 614).

The VM software may include additional patching and testing processes incorporated into the boot sequence. In particular, an update process may be run to apply additional updates from within the VM's OS environment (step 616). This may involve running patch scripts or special-purpose update software within the VM OS environment (e.g. running Windows Update in a Microsoft Windows environment).

Additionally, internal patch verification may be performed (step 618), again by running test software or scripts, in order to verify that any updates have been correctly applied. As an example, this could involve checking file system integrity or integrity of user data files.

Once tests have been completed, assuming no problems have been encountered, any required applications and services are then started up in step 620.

At this point, the replacement VM may then start providing services to HAP users.

In addition to verification performed during the update (either externally in step 606 or from within the running VM in step 618), external testing and monitoring may be performed once the VM has been started. Thus, in step 612, the update module configures one or more external testing/monitoring modules to perform testing and/or monitoring. The external testing/monitoring modules preferably run in one or more further VMs separate from the VM being updated, and separate from the update module (e.g. as part of the core services layer 208, see FIG. 2). Testing and monitoring may be implemented in a single module/VM or in separate modules/VMs. Configuration step 612 may occur asynchronously with steps 614-620, or may occur at some defined point before, during or after those steps.

In step 622, the external testing component tests operation of the running VM (for example by exchanging messages with the VM to test services provided). In step 624, the external monitoring component monitors operation of the running VM. Testing generally involves one-off processes carried out upon completion of the update, whereas monitoring may be performed on an ongoing basis.

In a variation, the replacement VM may initially by started up in an isolated mode (e.g. without access to networking), with the test module configured to test the isolated VM. If tests are successful, the VM may then transition to normal operation (or alternatively be shut down and restarted normally) after which it starts providing services to users of the HAP. Monitoring continues after normal operation of the VM has started.

The monitoring monitors operation of VMs to identify problems. The monitoring module may receive monitoring information from a monitoring component within each monitored VM and may additionally perform active testing, for example by periodically sending service requests to a VM and monitoring responses.

Following application of patches and startup of the replacement VM, the update module configures the external monitoring module and/or VM-internal monitoring component to start monitoring the replacement VM (see step 612). In some cases, all operational service VMs may be monitored by default, but the update module may configure the external monitoring module/internal monitoring component to modify standard monitoring behaviour, for example so as to monitor operation of the replacement VM more closely. This may involve raising monitoring priority for the VM; transmitting monitoring information to the monitoring module at an increased rate; increasing a frequency of active tests; or changing the types of monitoring operations and tests that are performed. This enhanced monitoring may continue for a defined period of time, with the system reverting to default monitoring behaviour (or no monitoring) after that time if no problems are encountered.

Monitoring involves analysing the behaviour of the VM to identify any deviations from expected behaviour. If problems are identified, for example if observed behaviour matches a predefined error criterion (whether during the enhanced monitoring period, or during normal operation subsequently), corrective action may be taken, for example by rolling back the patch and reverting to the pre-patch version of the VM. Patch rollback is described in more detail below.

Not every patch necessarily involves all of the steps described above. Instead, any particular patch can be configured so as to use the particular steps appropriate to that patch. The order of the steps in FIG. 6 may also vary between patches.

For example, for a simple software update, only the immutable storage volumes may need to be updated (step 602), and external verification (e.g. checksum-based) may be sufficient, so that steps 604, 612, 616 and 618 may be unnecessary. As another example, binary difference patching may not be suitable for some VMs (e.g. Windows-based VMs), in which case the entire software update may instead be applied internally in step 616 (e.g. by running Windows Update after booting the VM into Windows).

In another example, an updated software application may require user data files (stored in mutable storage volumes) to be in a different format than before. In that case, the necessary format conversion may be carried out in step 604 or step 616 using an appropriate conversion program.

Which (if any) type of verification, testing and monitoring (606, 612, 618, 622 and 624) is used may also vary from patch to patch.

The patch received at the HAP (e.g. by download from the Management Platform) is a data package which includes information specifying the patching steps required and the order in which those steps are to be performed. This may, for example, be in the form of a script. The patch also specifies which storage volumes are to be updated together with the necessary update information (e.g. binary difference information). The patch also includes testing information specifying details of any verification, testing and monitoring to be performed, along with checksums or other verification information. Test information may include test programs or scripts to be run, which may be included in the patch data package transmitted to the HAP.

While the external patching steps 602-606, 612 required are specified explicitly in the patch downloaded to the HAP, the internal patching steps (updates 616 and verification 618) are built into the updated VM software, since they run within the VM, under control of the VM's OS.

Background Patching

In one approach, the original VM—the VM being patched—may simply be terminated before the patching process is started. The original storage volumes associated with that VM can then be updated without the risk of disrupting services provided by the VM. However, this approach results in the services of that VM being unavailable throughout the entire patching process. Preferred embodiments therefore take a different approach, in which at least part of the patching process occurs in the background, while the original VM remains operational, thereby reducing downtime.

It may not be possible to patch mutable storage volumes in the background, since the active VM may continue to modify those volumes, resulting in potential inconsistencies. Thus, the active VM should be halted before changes are made to mutable volumes. However, the patching system can update immutable parts of the VM by working on copies of the relevant storage volumes in the background.

Figure 7:
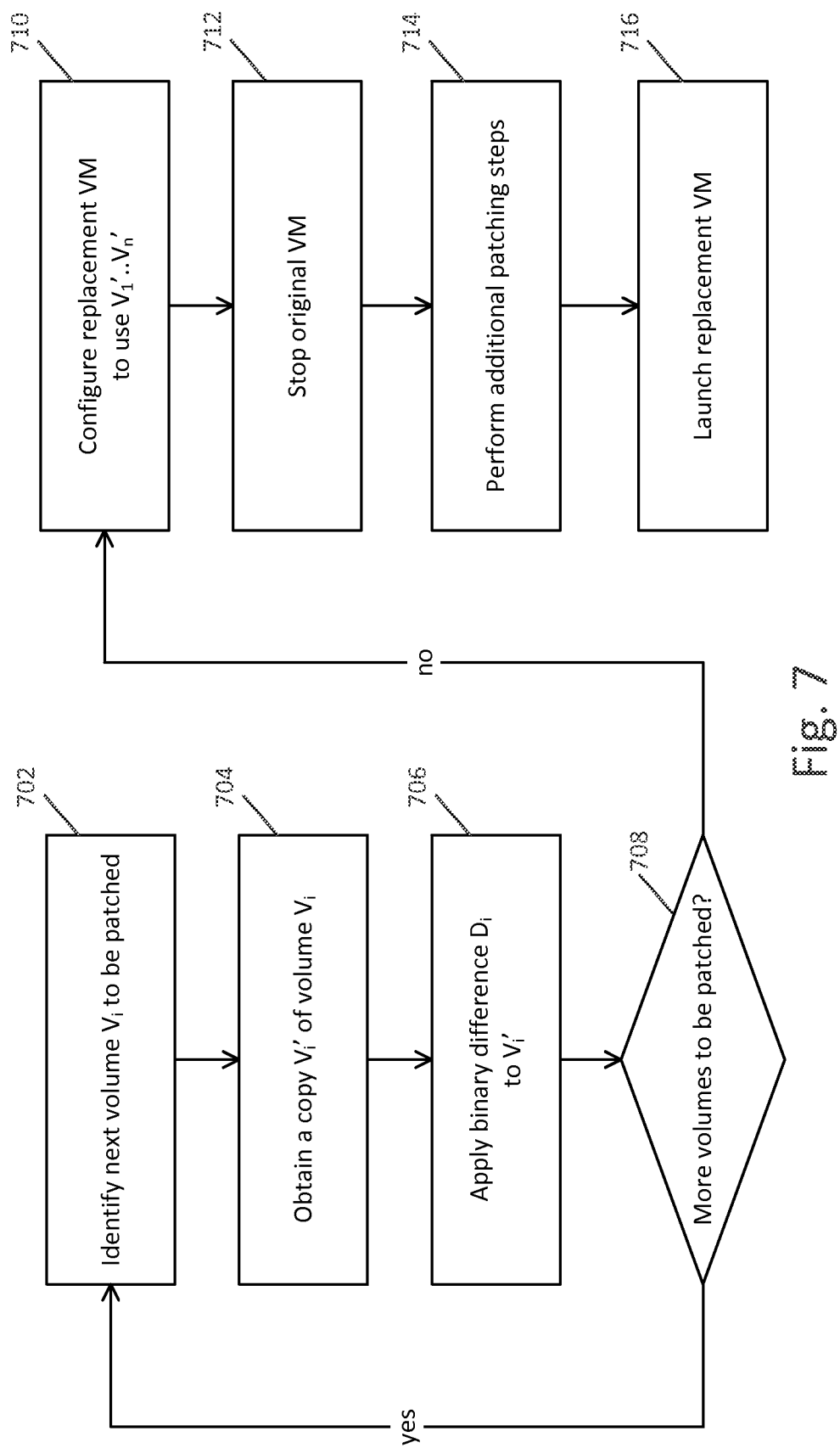
FIG. 7 illustrates part of the patching process in more detail.

The process is illustrated in FIG. 7, in relation to patching of a VM having a number of storage volumes $V_1$ to $V_n$ that are to be updated.

In step 702, the update module identifies the next storage volume $V_i$. In step 704, the update module obtains a copy $V_i'$ of the logical storage volume $V_i$. The copy may be obtained securely from the HAP repository as described above. Alternatively, the copy may be obtained as a snapshot of the running VM (provided the underlying storage technology supports snapshotting).

The binary difference information $D_i$ from the patch relating to storage volume $V_i$ is applied to the storage volume $V_i'$ in step 706. The binary difference information specifies the difference between the storage volume prior to update and the corresponding storage volume after update. Checks may be carried out at this point to verify that the patches have been applied correctly as described above, for example by comparing a checksum of the patched disk against one generated at the management server and transmitted with the patch files.

In step 708, the update module determines whether any further storage volumes are to be patched and returns to step 702 if so. Otherwise, the update module then migrates to the patched version of the VM software. This is achieved by configuring a replacement VM using the replacement volume (s) V' instead of the original volume(s) V (step 710). The original VM is then terminated in step 712. Any additional patching steps that need to be carried out after the original VM has been terminated are than completed in step 714 (for example any modification to user data or other mutable parts of the VM file system), and the replacement VM is started up in step 716.

The replacement VM may be configured to use the original versions of storage volumes that have not been modified during patch application, e.g. user data volumes (alternatively copies of such volumes may be obtained upon shutdown for use with the replacement VM). The original versions of storage volumes that have been patched can then be deleted, or retained for backup/rollback purposes.

Configuring a VM preferably includes the necessary steps for setting up the VM so that it is ready to be started up by the hypervisor. In particular, this typically involves creating the configuration file(s) which specify the resources required by the VM (e.g. no. of virtual CPUs, amount of memory, network connections, and storage volumes and associated disk image files that are to be associated with the VM). To start up the VM, a command is then sent to the hypervisor passing the configuration file(s), in response to which the hypervisor then creates a new running VM with the specified resources and with access to storage volumes created based on the provided disk image files. The new VM is started by booting OS software from a particular logical volume as specified in the configuration file(s).

The replacement VM is preferably configured to take the place of the original VM without requiring reconfiguration of other system components interacting with the original VM, for example by assigning the same network addresses (e.g. MAC and/or IP addresses) as used by the original VM to the replacement VM. This ensures that the replacement VM can continue provision of services to users in a seamless manner (though some transactions may be lost during the switchover).

In the FIG. 7 example, the original VM is stopped in step 712, after patching of immutable volumes and configuration of the replacement VM. Referring back to FIG. 6, this corresponds to a point after step 608 in the process flow, assuming no mutable volumes are updated in step 604 (since this typically occurs after the original VM has been stopped).

However, to reduce downtime still further, in some cases, the original VM may remain running (providing services) for longer. For example, the original VM may be stopped at commencement of, at some point during, or immediately after booting of the replacement OS (step 614), or even after steps 616 and 618 have been completed. In that case, transfer or synchronization of user data or other mutable information (e.g. assignment of user data volumes from the old to the new VM) would be carried out at this point, after the old VM has been shut down, but before the new VM starts running applications and providing services (step 620).

In some cases, the switchover may even occur after step 620, with both VMs potentially providing services concurrently during the switchover. The timing for terminating the original VM may depend on the nature of the services and the design of the VM software (for example concurrent operation may be possible if the VM application software is designed for distributed operation). The HAP preferably retains a copy of the original version of any modified volume. This allows the HAP to revert quickly to the original unpatched version of the VM in the event of a problem.

The steps shown in FIG. 7 may occur in a different order, and not all steps may be required for a particular patch. Furthermore, patching of individual storage volumes may occur in parallel, instead of in the sequential loop 702-708 illustrated.

Updating Multiple VMs in a Single Patch

The above description relates to the patching of a single VM. The described process can also be used to update multiple VMs, essentially simultaneously and seamlessly, at the HAP.

In this approach, a single patch downloaded to the HAP may include update information relating to multiple VMs.

To perform the patching, steps 702-710 of FIG. 7 are performed for each patched VM. Once the relevant storage volumes for the set of VMs being patched have been updated, and replacement VMs have been configured, the original VMs are terminated and the replacement VMs are started up (preferably immediately to minimize downtime). Because most of the patching activity occurs in the background on copies of the relevant logical volumes, while the original VMs remain operational to provide services, downtime can be reduced.

Using this approach, multiple VM patches may thus be grouped into a single HAP patch. For example, this can allow the HAP to be updated by the remote management platform in a single update operation. This enables the service provider to ensure consistency across HAPs and reliability of operation of individual HAPs.

Figure 8:
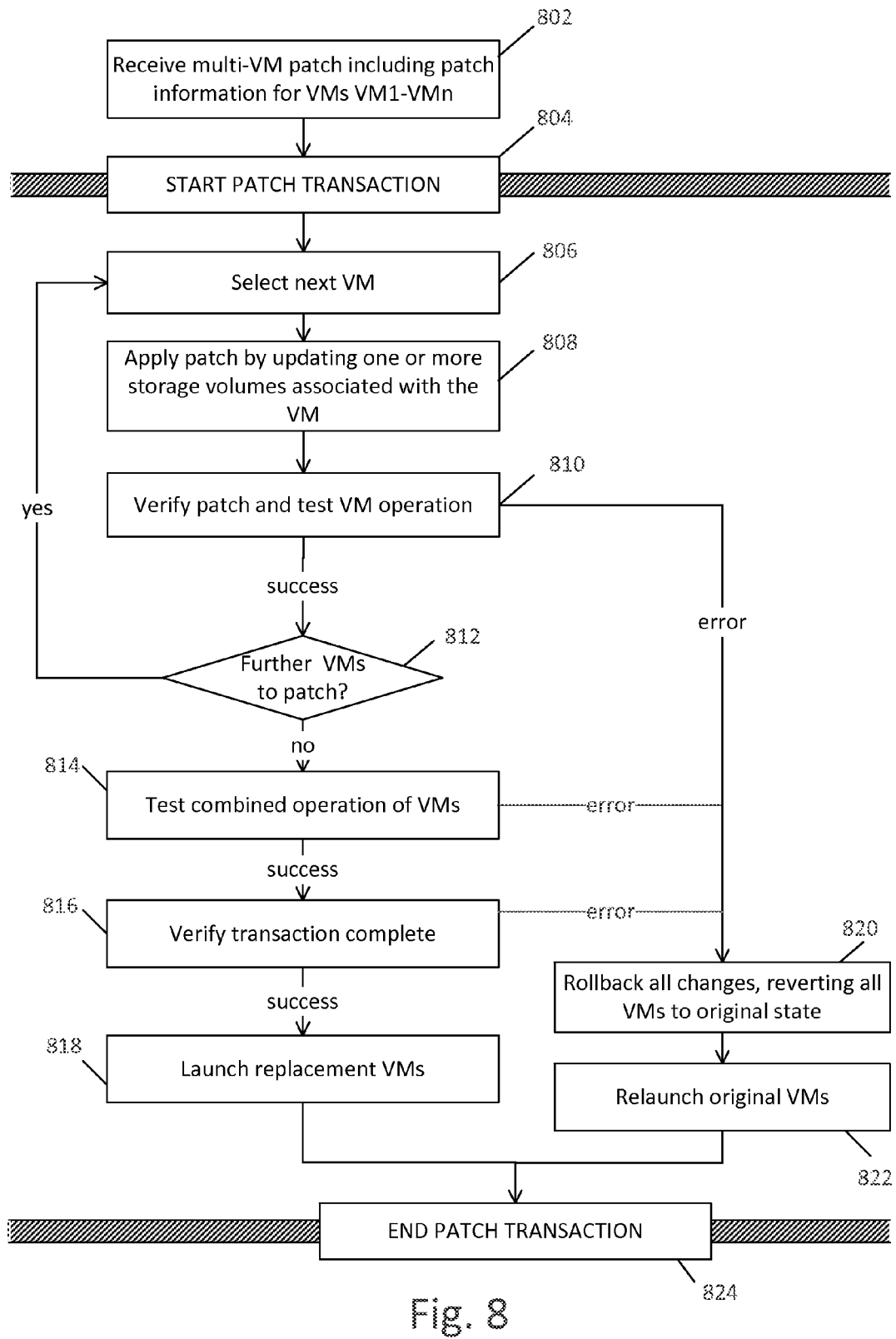
FIG. 8 illustrates patching multiple VMs in a single transaction.

In a preferred embodiment, the update module allows patches to multiple VMs to be applied as a single transactional operation, in which, if any of the individual VM updates fails, the entire patch can be rolled back, thereby reverting all VMs involved in the patch to their state prior to the start of patching. This is illustrated in FIG. 8.

In step 802, the patch module receives a multi-VM patch which includes patch information for multiple VMs, VM1-VMn. In step 804, a new patch transaction is started. The update module preferably retains a record of all steps carried out as part of the transaction, along with pre-update copies of any patched storage volumes, to enable rollback of the patch transaction in case of a problem during the transaction.

In step 806, the update module selects the next VM and applies the patch for that VM in step 808 using the methods previously described, e.g. in relation to FIGS. 6 and 7. During this process, copies of any updated storage volumes are retained.

In step 810, a determination is made as to whether the patch was applied successfully. This may, for example, include verification and testing operations as described above. If successful, then the update module determines whether any VMs remain to be patched in step 812. If yes, then the process returns to step 806. If not, patching of the VMs is complete.

While step 810 involves verification and testing of an individual one of the VMs being patched, additional verification and testing may be carried out in step 814 to check the combined operation of the VMs with each other (and/or with other VMs that are not part of the patch). As an example, multiple or all VMs in the patch may be started up in isolation from the remaining system, and testing and monitoring may then be performed in relation to the group of VMs. This may involve carrying out test transactions involving interactions between VMs.

Assuming the further testing is successful, the update module verifies in step 816 that the transaction is complete (i.e. that all necessary updates and tests have been successfully carried out). If yes, the replacement VMs are then launched in step 818 (or made operational to provide services if already launched during testing). Additional testing may be performed after the VMs have been launched. For example, tests may be carried out to check operation of the whole HAP including the updated VMs. Enhanced monitoring of the updated VMs, together with standard monitoring of other VMs in the HAP, may also reveal problems at this stage.

If at any stage (for example during the tests in steps 810, 814 or 816, or at any other point) it is determined that an error has occurred (for example because a storage volume could not be successfully patched, or tests performed after patching indicated a problem), the system may optionally attempt to correct the error (e.g. by retrying a failed operation). If recovery is not possible, then all changes made (to all of the VMs that are part of the transaction) are rolled back in step 820, thus returning all VMs to their original state prior to patching. Rollback may also be triggered by local or remote operator command.

In some cases, this may simply involve discarding updated storage volumes and any replacement VM configurations. The original VMs may still be running at this point and so may not be affected. However, any VMs that have already been terminated are relaunched in step 822 with their original configuration.

The patch transaction then ends in step 824, with either all VMs VM1-VMn running in updated form, or all running in original form.

Any retained copies of storage volumes may be deleted after successful completion of the patch. Alternatively, transaction information and pre-update backup copies of storage volumes may be retained (for example for a defined time period). This can enable the rollback of step 820 to be performed even after the patch has been applied (apparently) successfully and the replacement VMs have been launched in step 818. For example, testing and/or enhanced monitoring may continue after completion of the patch. If after the replacement VMs have become fully operational, problems are encountered with the updated configuration of the HAP, then rollback can still be performed to return the HAP to its configuration prior to the update. Thus, in preferred embodiments, the patch transaction may not be considered complete (step 824) until the replacement VMs have been operating acceptably for a predetermined time after completion of the patch.

Though described above as a sequential process, individual VMs may be patched in parallel. Regardless of the approach used, the transactional nature of the multi-VM patch means that either all VMs are patched at the end of the process, or the entire patch is rolled back and all VMs remain in their pre-patch state. Furthermore, rollback of an unsuccessful patch may be performed as described even if the patch only involves a single VM.

The approach described in relation to FIGS. 6-8 uses binary difference patching where possible but may be suitably modified to accommodate alternative patching techniques, for example using patch scripts or OS-specific software update tools. For example, patch information, patch scripts, modified files, or file-specific difference information may be transmitted instead of binary difference information relating to VM volumes as a whole, where volume-based difference patching is not possible.

Regardless of the patching techniques used, patching is preferably carried out in the background on copies of the VM storage volumes as described above to reduce switchover time. As mentioned above, a whole replacement VM (or set of replacement VMs) may be built in the background by copying storage volumes and applying patches as needed, with the replacement VM(s) then taking over from the original VM(s) when patching is complete. In this way, the entire HAP can be transitioned from an initial configuration to an updated configuration in a single reliable update process. Thus, version management may ultimately be applied on a whole-HAP basis, rather than in relation to individual VM software components.

Patch Creation

Patches are typically created by the HAP operator and made available for download to the HAP through the central management platform. To create a patch for a VM, the operator selects and configures the required patch or patches for the OS and/or application software associated with the VM.

As discussed previously, since the operator can tailor the VM build to the specific functionality that is to be provided by the VM, it is also possible to be selective in which patches are applied. For example, a VM acting as a mail server may not require certain OS functions to be included in the OS installation (e.g. media functions) and hence OS patches relating to such functions also do not need to be applied. Similarly, application software may be installed with selected components, and only those components then need to be patched.

This contrasts with conventional OS installations, which may require regular installation of a variety of patches, even if the relevant functions are never used. Apart from reducing storage requirements and complexity of the individual VM, this also makes testing of patches simpler and more reliable. By reducing the number of software components in the VM that need to be patched, the risk of unexpected interactions resulting from multiple applied patches can be reduced.

The operator maintains a master copy of any immutable volumes associated with a particular VM component. The selected patches are then applied to copies of those volumes, resulting in patched versions of those volumes. Any additional software components (for example components for internal patching and testing operations 616, 618 as depicted in FIG. 6) are also added to the software installation stored on the volumes.

The patched build of the VM can then be tested by the operator to ensure it performs as expected. Testing may be carried out within a test HAP environment maintained by the operator (which corresponds to the deployed HAP at the user premises). The modified VM build may be tested individually, as well as in conjunction with other VMs in the test environment. The operator can then modify the patch configuration to address any identified problems.

After successful testing, the binary difference is then determined between each patched storage volume and the corresponding master copy of the volume, to produce binary difference information for each volume. The binary difference information specifies the binary difference between the logical storage volume(s) before and after application of patches. The binary difference information is stored in one or more patch file(s)—for example one patch file could be provided per logical volume being patched.

The patch file(s) are then transmitted to the HAP, together with other patching information, such as patch scripts for patching mutable storage volumes, configuration information specifying how the patch is to be applied, and test scripts/programs for testing at the HAP as described above. This may occur as soon as the patch files(s) have been created, or at some later time, e.g. at a scheduled update time or in response to an update command received from the operator or an update request received from the HAP.

The use of binary difference patching removes the need to transmit a copy of the entire storage volume(s) to the HAP and to store such copies at the HAP. Instead only the differences are transmitted and stored, reducing bandwidth and storage requirements. However, alternatively, entire storage volumes may be transmitted (in which case the update at the HAP simply involves replacement of the relevant storage volumes).

The patches are then applied at the HAP. Again this may occur immediately in response to receipt of the patch file(s) or later, for example in response to remote command from the operator/management system, local command at the HAP, or at a pre-scheduled time.

A multi-VM patch may be created in the same way, with binary difference patch files and other patching information for each VM being generated as described above. As part of the patch creation, each VM being patched can be tested individually as already described. Additionally, integration testing can be performed to test the correct interaction between the newly patched VMs and any other unmodified VMs forming part of the standard (or customized) HAP deployment. Once correct operation has been confirmed, the relevant patch files and other information are bundled into a single HAP patch which can then be transmitted to the HAP. Thus, in this way the service operator can achieve patching of the entire HAP (or a specified subset of the HAP's VMs) in a single process. This allows the operator to ensure consistency across multiple HAP deployments.

Patching Security

A variety of techniques may be employed to improve the security of patching, for example to ensure integrity of patches and prevent unauthorised installation of patches or installation of patches from unauthorised sources. For example, patches may be protected using encryption, checksums, digital signatures, and any other appropriate security techniques.

However, such protection measures may not necessarily guard against the update module itself being compromised; for example, if an attacker were able to modify the update module itself, this may allow unauthorised patches to be installed on the HAP. In preferred embodiments, additional security measures are taken to protect the update module itself.

Figure 9:
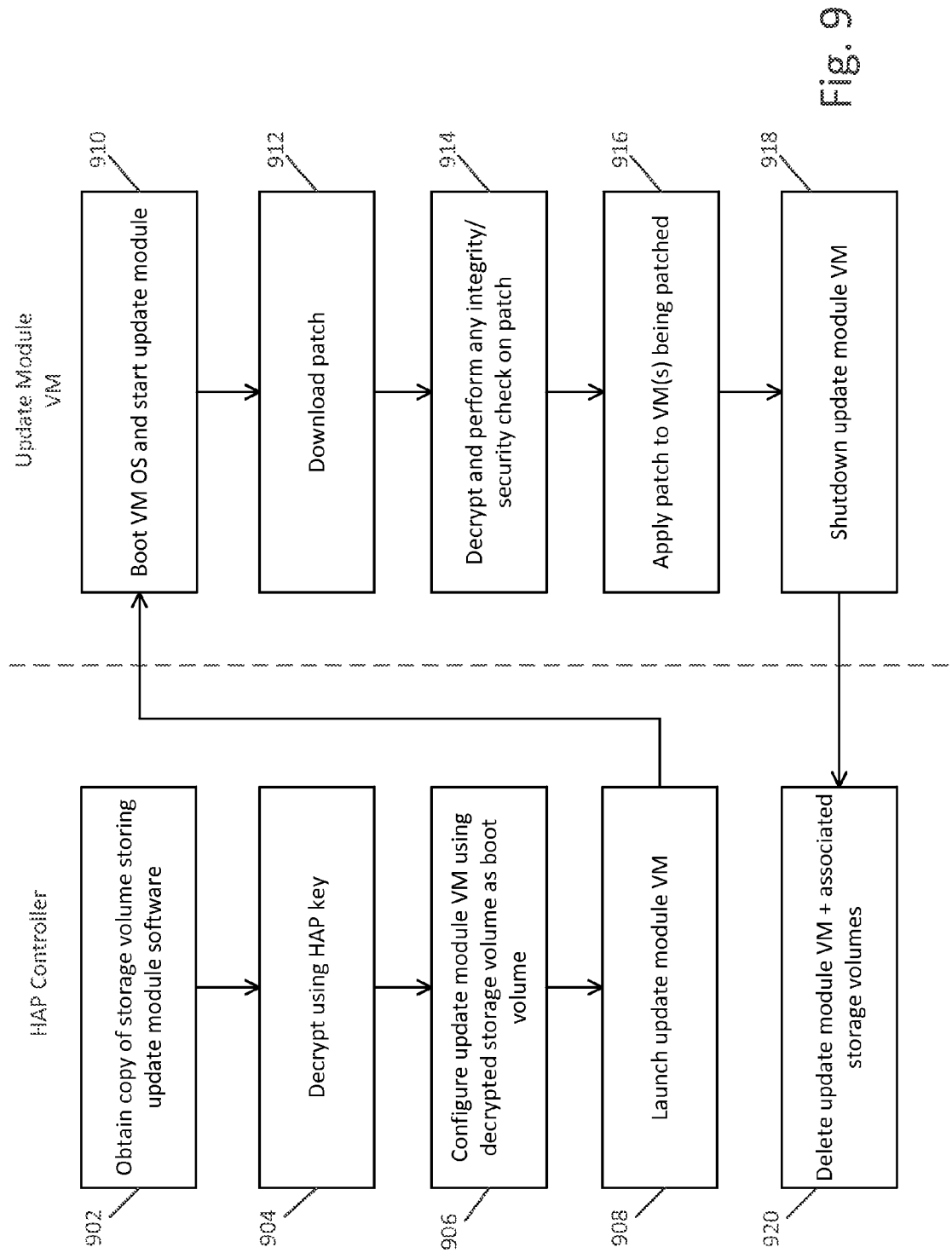
FIG. 9 illustrates a secure patching process.

In this approach, the update module does not run continuously on the HAP. Instead, the update module is started only when a patch is to be installed, and runs in a separate VM alongside other VMs, including the VM or VMs to be patched. The secure patching process is illustrated in FIG. 9.

The process is initiated by the HAP Controller. In step 902, the HAP Controller obtains a copy of an encrypted storage volume (or possibly multiple such volumes) storing operating system and application software for the update module. This may be obtained from a local master copy (e.g. from the HAP repository described previously) or may be downloaded to the HAP (e.g. from the remote management platform).

In step 904, the HAP Controller decrypts the storage volume(s) using a secret key. The HAP key may be specific for decryption of the update module or may be used by the HAP for other security purposes as well. The key may be held securely by the HAP Controller. The key may be distributed to and stored at the HAP using conventional secure key distribution and management techniques.

In step 906, the HAP Controller configures an update module VM using the decrypted main storage volume as boot volume, together with any other required storage volumes (e.g. for temporary storage). The main storage volume is treated as an immutable storage volume as discussed previously, and is thus configured for read-only access from within the update module VM. This prevents the update module from being modified subsequently (even if an attacker were to gain access to the update module VM).

In step 908, the HAP Controller launches the update module VM by passing the VM configuration to the hypervisor, which sets the VM running by initiating the VM boot sequence. This involves booting the OS and starting up the update module from the decrypted storage volume in step 910.

Once running, the following steps are then performed by the update module. In particular, the update module then downloads the patch in step 912, or alternatively accesses the patch if already downloaded. In step 914, the update module performs any additional security functions in relation to the patch, such as decrypting the patch files and/or checking patch file check sums or digital signatures.

In step 916, the update module applies the downloaded patch to the VM(s) being patched, for example using a method as described above in relation to FIGS. 6, 7 and/or 8. This may involve testing to confirm correct application of the patch as already described.

Once patching has been completed successfully (or rolled back if unsuccessful), the update module VM is shut down in step 918. The HAP Controller can then delete the update module VM and associated storage volumes in step 920.

In particular, any temporary storage volumes can simply be discarded at this stage, since there may be no requirement to maintain state between runs of the update module. However, records of the patch operations performed may be maintained and/or logged to an external logging component. The decrypted storage volume storing the update module OS and software is also discarded and is not used again—thus even if compromised or corrupted, this version of the software will not be used to perform further patches. Instead, on the next run of the update module, the process starts again at step 902, with a new copy of the update module being "unwrapped", i.e. obtained and decrypted from the HAP's secure repository.

The described approach thus reduces the opportunity for attackers to compromise the update module and hence the patching process. Unwrapping of the patching software (steps 902-904) is under control of the HAP Controller (which is highly secure and trusted); once running the software cannot be modified from within the update module VM—and even if modified, such modifications would be discarded after a single run of the software.

HAP in a Client Device

The HAP architecture has been described above mainly in the context of a server implementation, where the HAP is in the form of an on-premise server or server cluster providing software services to other devices over a local network. However, as mentioned previously, the HAP architecture and patching mechanisms described above are generally applicable to any type of computing device capable of supporting virtualisation. The architecture is especially suitable for computers supporting virtualisation at the processor level (as do the vast majority of contemporary laptop and desktop computers, as well as some tablets and smartphones using recent ARM processors).

A client computing device (or edge device) using the HAP system may be managed directly from the cloud (via the remote management platform) in the same way as the HAP server system described above. A HAP client device may also operate on a network having a HAP server system as previously described, and may access services from the HAP server in a similar way to other local network devices using the HAP server.

Such a client HAP may be managed directly from the cloud, or may be partially or wholly managed by the local HAP server system (with the HAP server system itself being managed from the cloud as previously described).

Figure 10:
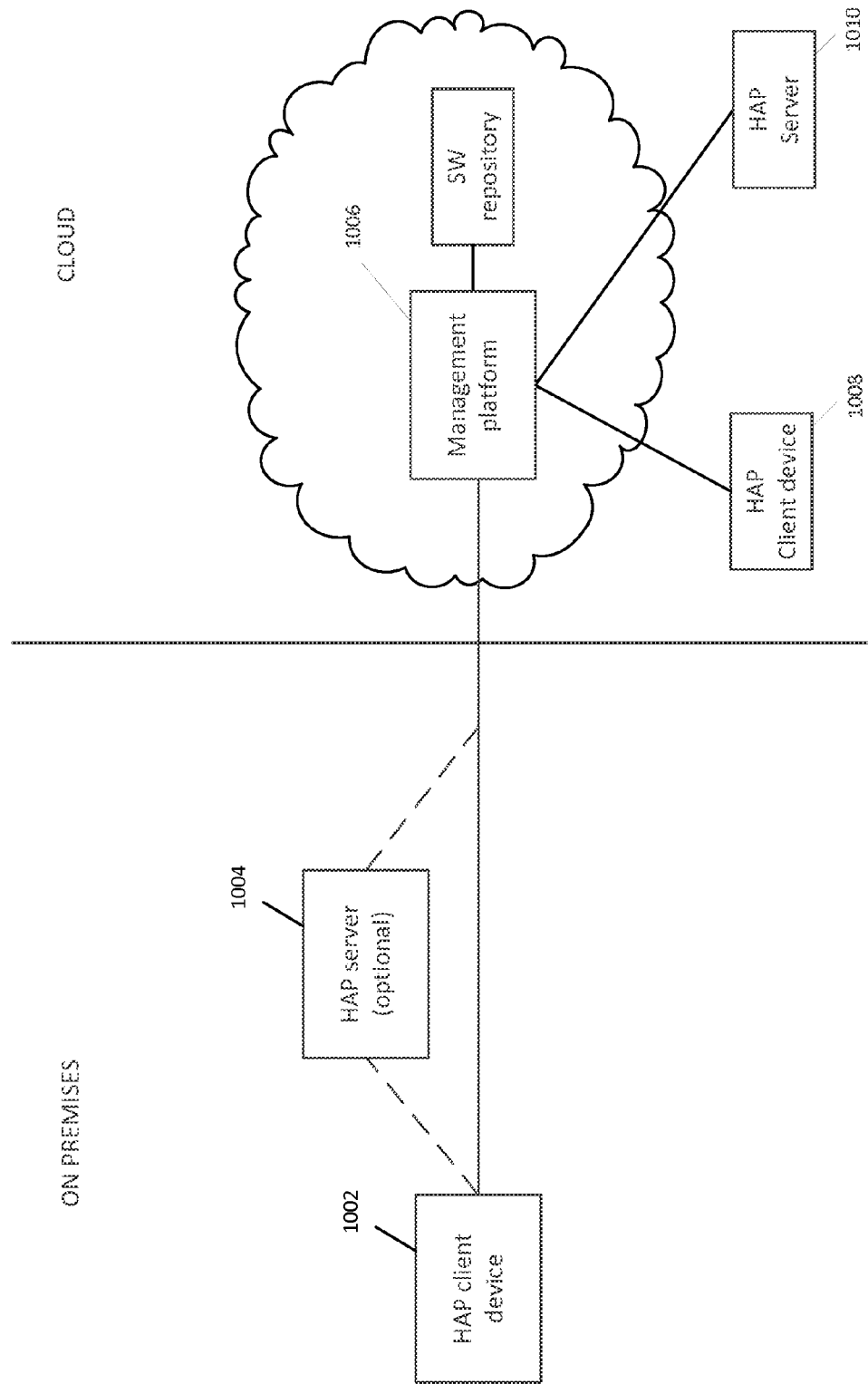
FIG. 10 illustrates use of the HAP architecture in client/edge devices.

This is illustrated in FIG. 10, which shows a HAP client device 1002 (typically part of a local network of devices as in FIG. 1, not shown here) managed either directly from management platform 1006 in the cloud, or indirectly via an on-premise HAP server 1004 (there may of course be multiple such client HAP devices at the location managed in this way). The management platform will at the same time manage other HAPs, both client devices (1008) and server devices (1010), that are located elsewhere. Regardless of whether it is managed directly or indirectly, the HAP client 1002 can use services (such as network security, file server and email services) that are made available by the HAP server 1004 to devices on the local network.

The architecture, components and functionality of a client device HAP implementation would generally be the same as described above. The main difference when applied to client devices typically lies in types of services exposed to the end user (end hence the selection of Service VMs running on the device).

A typical set of client services may include (but is not limited to):
Firewall
Anti-malware
One or more desktop operating systems with associated application software For example, a service VM in a client device may run a standard Windows desktop operating system including application software such as Microsoft Office, to provide conventional client workstation functionality. Other desktop operating environments such as Linux could also be provided. Multiple different desktop operating systems could be provided on the same HAP client device in separate service VMs, providing access to the user to different operating environments (for example to enable access to specialised application software).

Thus, the architecture depicted in FIGS. 2 and 3 and its various components remain applicable to a client HAP implementation without alteration, except that the 'payload' virtual machines may differ and typically include one or more desktop operating systems.

Where a client device HAP coexists in a local network with an on-premise HAP server at the same location (as depicted in FIG. 10), the HAP client device would not need to implement certain functionality already provided by the HAP server. For example, intrusion detection, web filter/proxy, domain control and traffic shaping may be implemented in the HAP server and would not need to be provided in a client orientated computer.

The described patching processes can be equally applied in a client HAP device to manage client software, thus allowing the client device to benefit from the described advantages (e.g. patches applied as whole-volume binary differences, improving consistency; patching occurs from outside the affected VM, which improves security and reliability; downtime can be minimised by patching ahead of taking down the original VM being patched; improved security through the described secure patching process). Similarly, patching multiple VMs in a single transaction with rollback capability, as well as patch testing and monitoring, can also be performed in such a client HAP implementation.

In some cases, in addition to managing access to physical storage and networking devices as described in relation to FIG. 3, a client device HAP implementation may also provide virtualised access to other hardware resources (such as graphics cards and attached peripherals).

It will be understood that the present invention has been described above purely by way of example, and modification of detail can be made within the scope of the invention.

The invention claimed is:

1. A method of updating software in a computer system, the computer system including virtualisation software arranged to provide a virtualisation environment for running a plurality of virtual machines, wherein each virtual machine is arranged to run a respective software module for providing a respective set of software services, the method comprising:
   storing master copies of storage entities in a repository, the master copies corresponding to storage entities used by virtual machines to run software modules;
   receiving a software update relating to a first software module running in a first virtual machine, the first software module stored in a first storage entity associated with the first virtual machine;
   obtaining a copy of the first storage entity from the repository;
   updating the obtained copy of the first storage entity in accordance with the received software update to produce a second storage entity containing an updated version of the first software module, the updating step performed by an update module running outside the first virtual machine; and
   creating a second virtual machine within the virtualisation environment, the second virtual machine associated with the second storage entity and arranged to run the updated version of the software module from the second storage entity.

2. A method according to claim 1, wherein the first virtual machine remains operational to provide software services during the updating step.

3. A method according to claim 1, wherein the updating comprises performing binary difference patching.

4. A method according to claim 1, wherein the software update includes binary difference information specifying a difference between the first storage entity and an updated version of the first storage entity, the updating step comprising modifying the copy of the first storage entity in accordance with the binary difference information.

5. A method according to claim 1, wherein the first storage entity is configured not to be modifiable from within the first virtual machine; the method preferably further comprising configuring the second storage entity not to be modifiable from within the second virtual machine.

6. A method according to claim 1, further comprising, after the updating step, performing one or more testing operations to verify correct application of the software update and/or correct operation of the updated software.

7. A method according to claim 6, wherein performing one or more testing operations comprises one or more of:
calculating check data of the second storage entity and comparing the calculated check data against corresponding check data included in the software update;
configuring an external test module to perform testing;
configuring a monitoring module to monitor operation of the second virtual machine.

8. A method according to claim 6, wherein the testing operations are performed by the update module or by another software module running outside the first and/or second virtual machine.

9. A method according to claim 6, wherein the updated software includes a testing component, the method comprising performing one or more testing operations by the testing component running within the second virtual machine.

10. A method according to claim 6, wherein the testing operations are performed based on testing information included in the received software update.

11. A method according to claim 6, wherein the received software update includes one or more test programs or test scripts, the method including performing testing operations by running the test program(s) or test script(s).

12. A method according to claim 1, comprising maintaining a copy of the first storage entity after the updating, and subsequently reverting to use of the first storage entity for running the first software module in its form prior to the update, preferably in response to an instruction to revert or detection of an error condition.

13. A method according to claim 1, comprising terminating the first virtual machine, the terminating preferably performed after the updating step, and preferably before starting the second virtual machine.

14. A method according to claim 1, comprising securely obtaining the copy of the first storage entity prior to updating.

15. A method according to claim 1, wherein the obtaining step comprises accessing an encrypted copy of the first storage entity in the repository; and decrypting the encrypted copy prior to updating.

16. A method according to claim 1, wherein the received software update includes update information relating to a plurality of software modules each associated with a respective first virtual machine, comprising:
performing the updating and creating steps for each of the first virtual machines to create a plurality of corresponding second virtual machines each adapted to run updated software.

17. A method of updating software in a computer system, the computer system including virtualisation software arranged to provide a virtualisation environment for running a plurality of virtual machines, wherein each virtual machine is arranged to run a respective software module for providing a respective set of software services, the method comprising:
receiving a software update including update information relating to a plurality of software modules associated with a plurality of first virtual machines of the virtualisation environment;
generating, by an update module running outside the first virtual machines, updated versions of the plurality of software modules based on the update information; and
replacing each of the first virtual machines with a respective second virtual machine adapted to run an associated updated software module.

18. A method according to claim 17, comprising performing the updating for each of the plurality of software modules as part of a single update transaction, and rolling back the update transaction in response to an identified error condition.

19. A method according to claim 17, comprising, in response to an error condition, discarding all updates made to the plurality of software modules in response to the software update.

20. A method according to claim 17, comprising, in response to an error condition, reverting to or continuing operation of the first virtual machines and/or first software modules in accordance with their configuration preceding the update.

21. A method according to claim 17, comprising, after completing the updating step for all of the first virtual machines, terminating each of the first virtual machines, and preferably starting up each of the corresponding second virtual machines.

22. A method according to claim 1, comprising running the update module in a third virtual machine within the virtualisation environment, the third virtual machine separate from the first and second virtual machines.

23. A method according to claim 22, comprising, in response to an instruction to perform the software update, creating the third virtual machine, and initiating running of the update module within the third virtual machine.

24. A method according to claim 23, comprising, in response to the instruction to perform the software update, securely obtaining a copy of the update module software, and running the obtained software within the third virtual machine.

25. A method of updating software in a computer system, the computer system including virtualisation software arranged to provide a virtualisation environment for running a plurality of virtual machines, wherein each virtual machine is arranged to run a respective software module for providing a respective set of software services, the method comprising:
receiving an instruction to perform a software update relating to a first software module running in a first virtual machine; and
in response to the update instruction, replacing the first virtual machine with a second virtual machine running an updated version of the first software module, the updated version generated by an update module based on software update information associated with the received update instruction, wherein the replacing comprises:
in response to the update instruction, securely obtaining a copy of the update module software;
initiating running of the obtained update module software in a third virtual machine;
generating, by the running update module, the updated version of the first software module; and
configuring the second virtual machine to run the updated version of the first software module.

26. A method according to claim 25, wherein securely obtaining comprises decrypting a master copy of the update module software.

27. A method according to claim 26, wherein the master copy comprises an encrypted storage entity storing the update module software in encrypted form, the method including:
decrypting the encrypted storage entity to produce a decrypted storage entity;

associating the decrypted storage entity with the third virtual machine; and running the update module within the third virtual machine from the decrypted storage entity.

28. A method according to claim 25, comprising terminating the third virtual machine and/or the update module after completion of the software update.

29. A method according to claim 28, wherein the securely obtained copy of the update module software is not used again after termination.

30. A method according to claim 1, wherein the first virtual machine is associated with:
one or more immutable storage entities storing a first, immutable, portion of files associated with the first software module, the immutable portion comprising files which are not modified during operation of the module to provide software services; and
one or more mutable storage entities storing a second, mutable, portion of the files associated with the first software module, the mutable portion comprising files which may be modified during operation of the module to provide software services.

31. A method of providing modular software services in a computer system, the computer system including virtualisation software arranged to provide a virtualisation environment for running a plurality of virtual machines, each virtual machine providing a respective set of software services and being associated with one or more storage entities storing files used in providing the services, the method comprising:
associating with a first one of the virtual machines one or more immutable storage entities comprising a first, immutable, portion of the files associated with the first virtual machine, the immutable portion comprising files which are not modified during operation of the virtual machine to provide software services;
associating with the first virtual machine one or more mutable storage entities storing a second, mutable, portion of the files associated with the first virtual machine, the second portion comprising files which may be modified during operation of the virtual machine to provide software services;
applying a software update in relation to the first virtual machine, the applying comprising replacing the first virtual machine with a second virtual machine running updated software; wherein the replacing comprises:
updating one or more of the immutable storage entities or copies thereof by an update module running outside the first and second virtual machines;
associating the updated storage entities with the second virtual machine;
launching the second virtual machine; and
updating one or more of the mutable storage entities or copies thereof by an update component running within the second virtual machine.

32. A method according to claim 31, wherein the one or more immutable storage entities are configured for read-only access from within the first virtual machine, and preferably wherein the one or more mutable storage entities are configured for read and write access from within the first virtual machine.

33. A method according to claim 32, wherein access permissions are enforced by the virtualisation software.

34. A method according to claim 31, wherein the immutable storage entities comprise one or more of:
a first immutable storage entity comprising software for execution by the first virtual machine; and
a second immutable storage entity comprising configuration data relating to the software and/or the first virtual machine.

35. A method according to claim 34, wherein the configuration data is specific to the computer system, the first storage entity comprising further configuration data common to a plurality of computer systems using the software.

36. A method according to claim 31, wherein the mutable storage entities comprise one or more of:
a first mutable storage entity comprising user data created during provision of services to a user by software running in the first virtual machine, the user data preferably associated with application software running in the first virtual machine, preferably wherein the user data is data that should be retained after the virtual machine is terminated or restarted;
a second mutable storage entity comprising configuration data relating to application or operating system software running in the first virtual machine, preferably wherein the configuration data is data that should be retained after the virtual machine is terminated or restarted; and
a third mutable storage entity comprising temporary data associated with application or operating system software running in the first virtual machine, wherein the temporary data is preferably data created during operation of the virtual machine which does not need to be retained if the virtual machine is terminated or restarted.

37. A method according to claim 36, comprising backing up the first and/or second mutable storage entities but not the third mutable storage entity.

38. A method according to claim 36, wherein the second virtual machine is configured to use the first and/or second storage entities but not the third storage entity.

39. A method according to claim 31, wherein the first virtual machine is associated with a file system, the method comprising:
including different first and second parts of the file system in respective first and second storage entities, preferably wherein the first storage entity is an immutable storage entity and the second storage entity is a mutable storage entity; and
configuring the storage entities such that an access to a predetermined location in the first storage entity from within the first virtual machine resolves to a location in the second storage entity.

40. A method according to claim 39, the configuring comprising:
including in the first part of the file system in the first storage entity a file system link to a target location in the second part of the file system in the second storage entity; or
providing a mounting point in the first part of the file system in the first storage entity for mounting a location or directory tree in the second part of the file system in the second storage entity.

41. A method according to claim 31, wherein applying a software update in relation to the first virtual machine comprises updating one or more of the immutable storage entities or copies of those entities using binary difference patching, preferably based on binary difference information specifying a binary difference between a storage entity as a whole and an updated version of the storage entity.

42. A method according to claim 41, wherein the applying comprises updating one or more of the mutable storage entities using an update technique other than binary difference patching.

43. A method according to claim 1, wherein the virtualisation software comprises one or more of:
- a virtual machine manager;
- a control module, preferably arranged to run within a privileged virtual machine within the virtualisation environment;
- a storage virtualisation module arranged to provide access to logical storage entities to virtual machines of the virtualisation environment;
- a network module arranged to provide access to one or more network connections of the computer system to virtual machines of the virtualisation environment.

44. A method according to claim 1, wherein storage entities comprise storage volumes, preferably logical storage volumes.

45. A tangible non-transitory computer-readable medium comprising software code adapted, when executed on a data processing apparatus, to perform a method as claimed in claim 1.

46. A tangible non-transitory computer-readable medium comprising software code adapted, when executed on a data processing apparatus, to perform a method as claimed in claim 17.

47. A tangible non-transitory computer-readable medium comprising software code adapted, when executed on a data processing apparatus, to perform a method as claimed in claim 25.

48. A tangible non-transitory computer-readable medium comprising software code adapted, when executed on a data processing apparatus, to perform a method as claimed in claim 31.

49. A computer system for providing modular software services, the computer system comprising at least one non-transitory processor and at least one computer-readable medium, the at least one computer-readable medium storing:
- a repository comprising master copies of storage entities, the master copies corresponding to storage entities used by virtual machines of the computer system to run software modules; and
- software for execution by the at least one processor, the software comprising:
- virtualisation software arranged to provide a virtualisation environment for running a plurality of virtual machines, wherein each virtual machine is arranged to run a respective software module for providing a respective set of software services; and
- update software configured to:
  - receive a software update relating to a first software module running in a first virtual machine, the first software module stored in a first storage entity associated with the first virtual machine;
  - obtain a copy of the first storage entity from the repository;
  - update the obtained copy of the first storage entity in accordance with the received software update to produce a second storage entity containing an updated version of the first software module, the updating performed by an update module adapted to run outside the first virtual machine; and
  - create a second virtual machine within the virtualisation environment, the second virtual machine associated with the second storage entity and arranged to run the updated version of the software module from the second storage entity.

50. A computer system for providing modular software services, the computer system comprising at least one non-transitory processor and at least one computer-readable medium storing software for execution by the at least one processor, the software comprising:
- virtualisation software arranged to provide a virtualisation environment for running a plurality of virtual machines, wherein each virtual machine is arranged to run a respective software module for providing a respective set of software services; and
- update software configured to:
  - receive a software update including update information relating to a plurality of software modules associated with a plurality of first virtual machines of the virtualisation environment;
  - generate, by an update module adapted to run outside the first virtual machines, updated versions of the plurality of software modules based on the update information; and
  - replace each of the first virtual machines with a respective second virtual machine adapted to run an associated updated software module.

51. A computer system for providing modular software services, the computer system comprising at least one non-transitory processor and at least one computer-readable medium storing software for execution by the at least one processor, the software comprising:
- virtualisation software arranged to provide a virtualisation environment for running a plurality of virtual machines, wherein each virtual machine is arranged to run a respective software module for providing a respective set of software services; and
- update software configured to:
  - receive an instruction to perform a software update relating to a first software module running in a first virtual machine; and
  - in response to the update instruction, replace the first virtual machine with a second virtual machine running an updated version of the first software module, the updated version generated by an update module based on software update information associated with the received update instruction, wherein the replacing comprises:
    - in response to the update instruction, securely obtaining a copy of the update module software;
    - initiating running of the obtained update module software in a third virtual machine;
    - generating, by the running update module, the updated version of the first software module; and
    - configuring the second virtual machine to run the updated version of the first software module.

52. A computer system for providing modular software services, the computer system comprising at least one non-transitory processor and at least one computer-readable medium storing software for execution by the at least one processor, the software comprising:
- virtualisation software arranged to provide a virtualisation environment for running a plurality of virtual machines, each virtual machine providing a respective set of software services, and to associate a virtual machine with one or more storage entities storing files used in providing software services;
- configuration software configured to:
- associate with a first one of the virtual machines one or more immutable storage entities comprising a first, immutable, portion of the files associated with the first virtual machine, the immutable portion comprising files which are not modified during operation of the virtual machine to provide software services; and associate with the first virtual machine one or more mutable storage entities storing a second, mutable, portion of the files associated with the first virtual machine, the second portion comprising files which may be modified during operation of the virtual machine to provide software services; and update software configured to:

apply a software update in relation to the first virtual machine, the applying comprising replacing the first virtual machine with a second virtual machine running updated software; wherein the replacing comprises:

updating one or more of the immutable storage entities or copies thereof by an update module running outside the first and second virtual machines;

associating the updated storage entities with the second virtual machine;

launching the second virtual machine; and updating one or more of the mutable storage entities or copies thereof by an update component running within the second virtual machine.

* * * * *